(12) United States Patent
Cappello et al.

(10) Patent No.: US 10,596,862 B1
(45) Date of Patent: Mar. 24, 2020

(54) DYNAMIC WHEEL MANAGEMENT SYSTEM

(71) Applicant: Airgo IP, LLC, Oklahoma City, OK (US)

(72) Inventors: Joseph S. Cappello, Oklahoma City, OK (US); Peter Jankowski, Oklahoma City, OK (US); Jay Thompson, Oklahoma City, OK (US)

(73) Assignee: Airgo IP, LLC, Oklahoma City, OK (US)

( * ) Notice: Subject to any disclaimer, the term of this patent is extended or adjusted under 35 U.S.C. 154(b) by 53 days.

(21) Appl. No.: 15/477,286

(22) Filed: Apr. 3, 2017

Related U.S. Application Data

(63) Continuation-in-part of application No. 15/388,092, filed on Dec. 22, 2016, now Pat. No. 10,005,325, which is a continuation-in-part of application No. 15/087,458, filed on Mar. 31, 2016, now Pat. No. 10,086,660.

(51) Int. Cl.
*B60C 23/00* (2006.01)
*B60C 23/04* (2006.01)

(52) U.S. Cl.
CPC ........ *B60C 23/003* (2013.01); *B60C 23/0486* (2013.01)

(58) Field of Classification Search
CPC . B60C 23/002; B60C 23/003; B60C 23/0486; B60C 23/009
USPC ............................................ 152/417; 701/36
See application file for complete search history.

(56) References Cited

U.S. PATENT DOCUMENTS

| | | | |
|---|---|---|---|
| 1,072,907 A | 9/1913 | Brooks | |
| 1,083,847 A | 1/1914 | McDowell et al. | |
| 1,165,057 A | 12/1915 | Bayly | |
| 1,205,504 A | 11/1916 | Bearce | |
| 1,827,662 A | 10/1931 | Maas | |
| 2,156,841 A | 5/1939 | Davis | |
| 2,177,042 A | 10/1939 | Michael | |
| 2,242,207 A | 5/1941 | Bowers | |
| 2,657,731 A | 11/1953 | Gozzoli | |
| 2,849,047 A | 8/1958 | Lamont et al. | |
| 2,976,606 A | 3/1961 | Huet | |
| 3,276,503 A | 10/1966 | Kilmarx | |
| 3,367,722 A | 2/1968 | Miyanaga | |
| 3,705,614 A | 12/1972 | Juttner et al. | |
| 3,838,717 A | 10/1974 | Wolf | |
| 3,933,397 A * | 1/1976 | Hood | A63C 17/22 384/542 |

(Continued)

*Primary Examiner* — Kip T Kotter
(74) *Attorney, Agent, or Firm* — Hall Estill Attorneys at Law

(57) ABSTRACT

A tire pressure management system includes at least an axle, which houses pressurized fluid, and is supported by a tire. A vehicle frame supported by the axle, by way of a suspension is disposed between frame and the axle. Also included is a pressure management controller (PMC) supported by the frame, which communicates with the tire. A load detection device (LDD) interacting with the suspension determines a value for a load supported by the suspension. The PMC provides at least a central processing unit (CPU) programmed with a lookup table that associates the value determined by the LDD with a predetermined pressure for the tire. The CPU directs an inflation, else a deflation of of the tire based on the determined value.

19 Claims, 18 Drawing Sheets

(56) References Cited

U.S. PATENT DOCUMENTS

| | | | | |
|---|---|---|---|---|
| 4,154,279 | A | 5/1979 | Tsuruta | |
| 4,387,931 | A | 6/1983 | Bland | |
| 4,582,107 | A | 4/1986 | Scully | |
| 4,641,698 | A | 2/1987 | Bitonti | |
| 4,685,501 | A | 8/1987 | Williams | |
| 4,763,709 | A * | 8/1988 | Scholer | B60C 23/001 141/38 |
| 4,805,681 | A | 2/1989 | Vollmer et al. | |
| 4,844,138 | A | 7/1989 | Kokubu | |
| 4,883,106 | A | 11/1989 | Schultz et al. | |
| 4,924,926 | A | 5/1990 | Schultz et al. | |
| 5,080,156 | A | 1/1992 | Bartos | |
| 5,080,157 | A | 1/1992 | Oerter | |
| 5,174,839 | A | 12/1992 | Schultz et al. | |
| 5,236,028 | A | 8/1993 | Goodell et al. | |
| 5,287,906 | A | 2/1994 | Stech | |
| 5,377,736 | A | 1/1995 | Stech | |
| 5,398,743 | A | 3/1995 | Bartos | |
| 5,429,167 | A | 7/1995 | Jensen | |
| 5,482,358 | A | 1/1996 | Kuck | |
| 5,538,062 | A | 7/1996 | Stech | |
| 5,558,408 | A | 9/1996 | Naedler et al. | |
| 5,584,949 | A | 12/1996 | Ingram | |
| 5,629,873 | A * | 5/1997 | Mittal | B60C 23/003 152/415 |
| 5,629,874 | A * | 5/1997 | Mittal | B60C 23/003 152/415 |
| 5,735,364 | A | 4/1998 | Kinoshita | |
| 5,752,746 | A | 5/1998 | Perry | |
| 5,767,398 | A | 6/1998 | Naedler | |
| 5,769,979 | A | 6/1998 | Naedler | |
| 6,105,645 | A | 8/2000 | Ingram | |
| 6,144,295 | A * | 11/2000 | Adams | B60C 23/003 137/224 |
| 6,145,559 | A | 11/2000 | Ingram, II | |
| 6,218,935 | B1 * | 4/2001 | Corcoran | B60C 23/002 340/441 |
| 6,435,238 | B1 | 8/2002 | Hennig | |
| 6,585,019 | B1 | 7/2003 | Ingram | |
| 6,968,882 | B2 | 11/2005 | Ingram | |
| 7,302,980 | B2 | 12/2007 | Ingram | |
| 7,418,989 | B2 | 9/2008 | Ingram | |
| 9,278,587 | B2 * | 3/2016 | Honig | B60C 23/001 |
| 9,969,225 | B2 * | 5/2018 | Hansen | B60C 23/002 |
| 2003/0216845 | A1 * | 11/2003 | Williston | B60C 23/003 701/36 |
| 2004/0155516 | A1 * | 8/2004 | Colussi | B60C 23/003 301/5.24 |
| 2004/0187568 | A1 | 9/2004 | Locatelli | |
| 2005/0133134 | A1 | 6/2005 | Ingram et al. | |
| 2006/0007007 | A1 * | 1/2006 | Claussen | B60C 23/003 340/605 |
| 2006/0179929 | A1 | 8/2006 | Becker | |
| 2007/0038408 | A1 * | 2/2007 | Gaunt | B60C 23/001 702/138 |
| 2011/0140875 | A1 * | 6/2011 | Be | B60C 23/009 340/442 |
| 2011/0175716 | A1 * | 7/2011 | Medley | B60C 23/002 340/442 |
| 2013/0190979 | A1 * | 7/2013 | Clayton | B60C 23/002 701/36 |
| 2013/0306192 | A1 * | 11/2013 | Hennig | B60C 23/003 141/4 |
| 2015/0174972 | A1 * | 6/2015 | Zhou | B60C 23/003 340/447 |
| 2016/0059643 | A1 * | 3/2016 | Infantini | B60C 23/00 152/415 |
| 2017/0120697 | A1 * | 5/2017 | Hennig | B60C 23/003 |
| 2017/0349009 | A1 * | 12/2017 | Ehrlich | B60C 23/003 |
| 2018/0236825 | A1 * | 8/2018 | Hinz | B60C 23/003 |

* cited by examiner

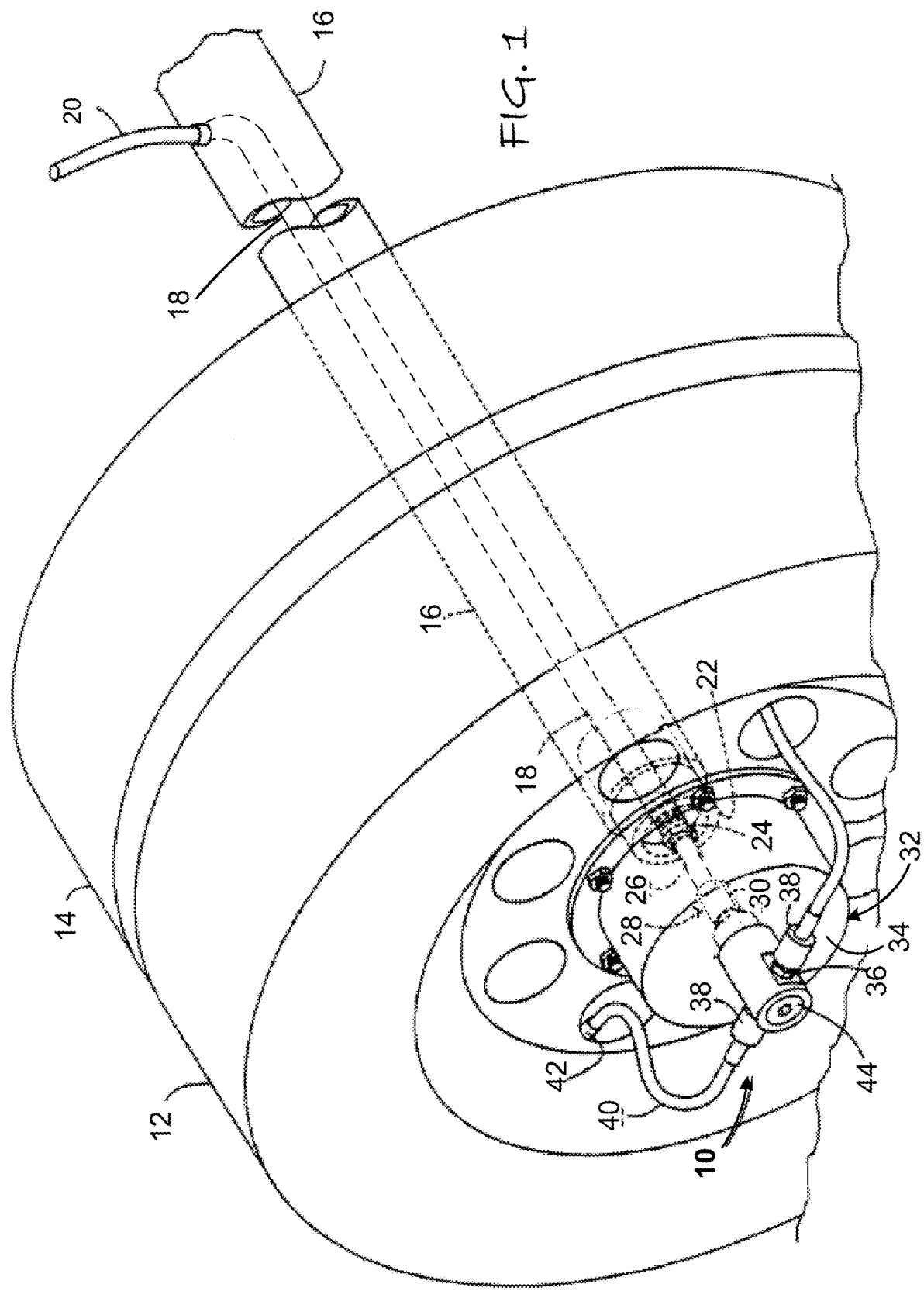

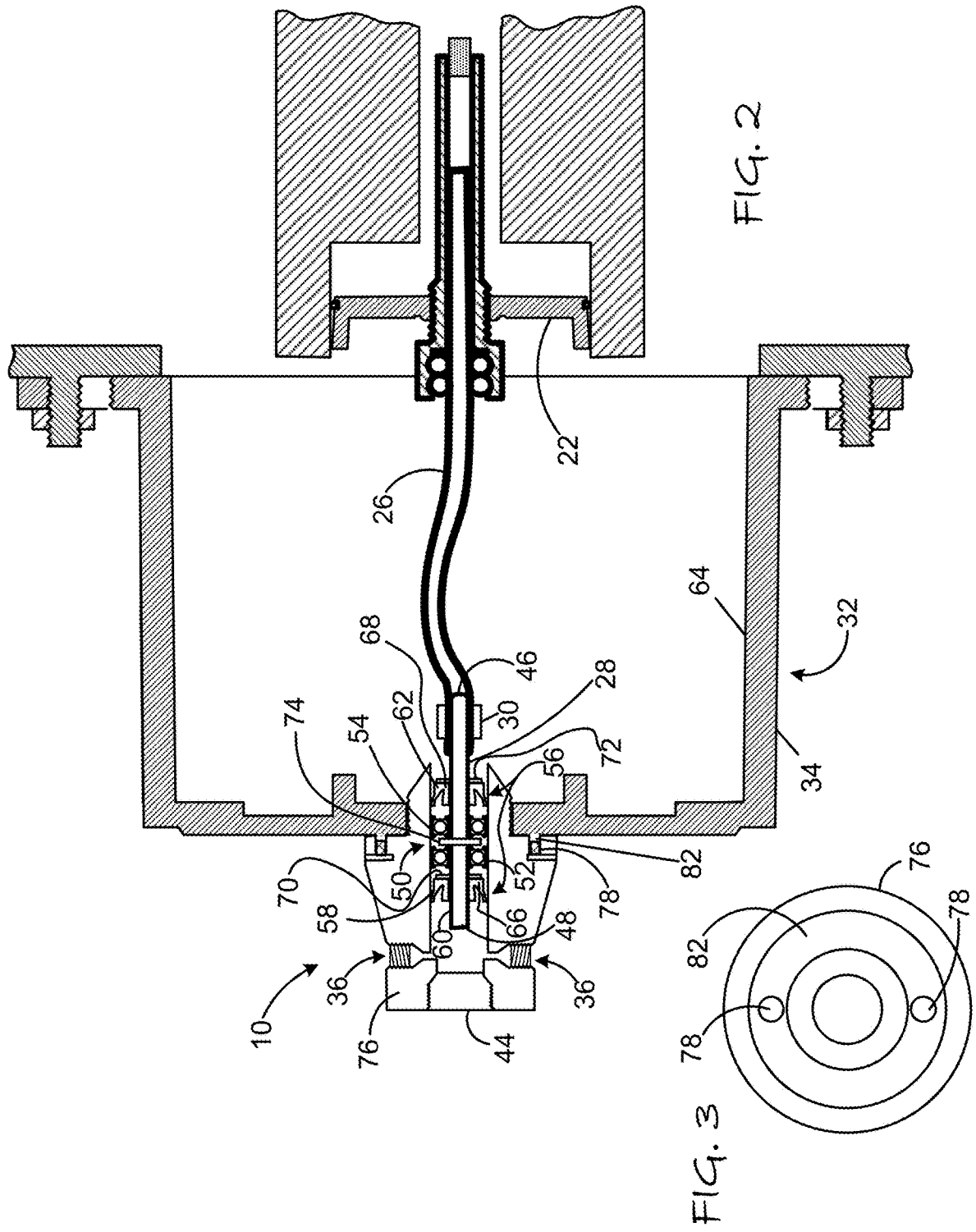

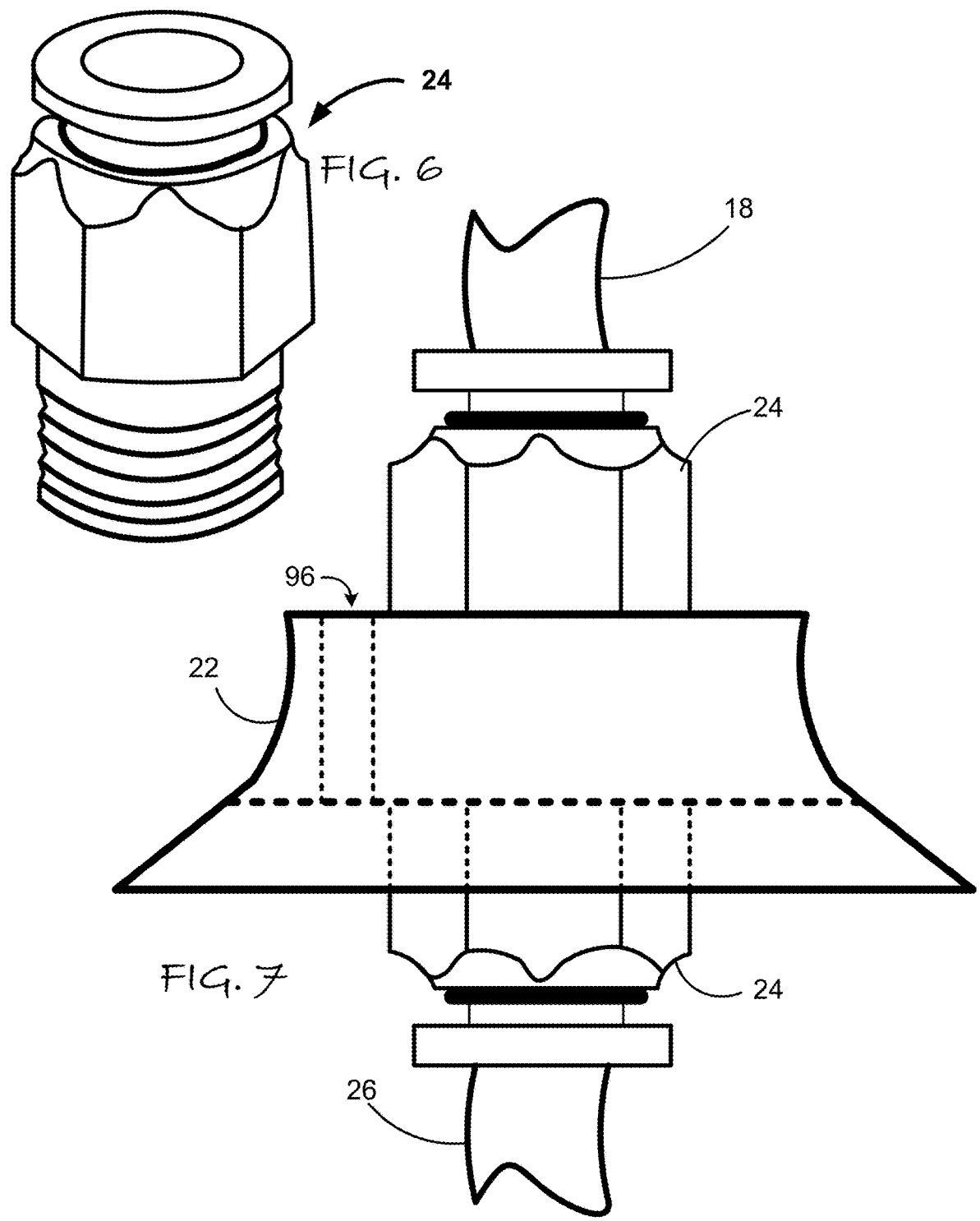

DYNAMIC WHEEL MANAGEMENT SYSTEM

CROSS REFERENCE TO RELATED APPLICATIONS

This application is a continuation-in-part of U.S. patent application Ser. No. 15/388,092 filed Dec. 22, 2016, entitled "Tire Pressure Management System," which issued at U.S. Pat. No. 10,005,325 on Jun. 26, 2018, which is a continuation-in-part of U.S. patent application Ser. No. 15/087,458 filed Mar. 31, 2016, entitled "Tire Pressure Management System," which issued as U.S. Pat. No. 10,086,660 on Oct. 2, 2018.

FIELD OF THE INVENTION

The present invention relates to the field of tire pressure maintenance. More particularly, the present invention relates to the management of tire pressure of tires supporting tractor trailers, even while the trailers are traveling along a roadway.

BACKGROUND OF THE INVENTION

The present invention relates to an improved rotary union for use in a central tire pressure management system for automatically maintaining the inflation pressure of the pneumatic tires on moving vehicles such as tractor trailers. Typically, tractor trailers utilize the air compressor on the tractor as a source of pressurized air to activate braking systems. The compressor directs air to the reserve air brake tank on the trailer, which generally corresponds to the range of typical inflation pressures in the tires used on trailers. Air from the reserve air brake tank is first directed to the braking system to maintain the air pressure in the braking system. In conventional tire inflation systems, excess air is directed from the tank through a pressure protection valve to a control box for the tire inflation system. The pressure protection valve only opens to direct the air to the control box when excess air pressure is present, thereby preventing air from being directed to the tire inflation system which is needed for the trailer braking system.

The control box contains a pressure regulator which is set to the cold tire pressure of the particular tires on the trailer so as to supply air to the tires at the desired pressure level in the event of a leak. Air is directed from the control box to the leaking tire through one of the trailer axles, which either carries an air line from the control box, or is sealed and functions as an air conduit. The pressurized air carried by the axles communicates with each pair of trailer tires mounted thereon through a rotary union assembly by which air flow is directed from a stationary air line to the valve stems on the rotating tires. Pressure responsive valves are employed between each rotary union assembly and its associated tires so that upon the occurrence of a leak in one of the tires, the resulting pressure loss will cause one of the valves to open and allow air flow from the rotary union assembly to pass therethrough to the leaking tire.

As tire inflation systems become adopted for broader uses, reliability and ease of maintenance, as well as an ability to manage under inflated as well as over inflated tires have emerged as important demands from the industry, accordingly improvements in apparatus and methods of installing tire inflation systems are needed and it is to these needs the present invention is directed.

SUMMARY OF THE INVENTION

In accordance with preferred embodiments, a tire pressure management system includes at least an axle, which houses pressurized fluid, and is supported by a tire. A vehicle frame supported by the axle, by way of a suspension is disposed between frame and the axle. Also included is a pressure management controller (PMC) supported by the frame, which communicates with the tire. A load detection device (LDD) interacting with the suspension determines a value for a load supported by the suspension. The PMC provides at least a central processing unit (CPU) programmed with a lookup table that associates the value determined by the LDD with a predetermined pressure for the tire. The CPU directs an inflation, else a deflation of the tire based on the determined value.

These and various other features and advantages that characterize the claimed invention will be apparent upon reading the following detailed description and upon review of the associated drawings.

BRIEF DESCRIPTION OF THE DRAWINGS

The present invention is illustrated by way of example and not limitation in the figures of the accompanying drawings, in which like references indicate similar elements and in which:

FIG. 1 is a partial perspective view of a rotary union assembly of the present novel tire pressure management system shown secured to an outer wheel of a pair of tractor trailer tires mounted on a stationary axle.

FIG. 2 is a sectional side view of the rotary union assembly of the present novel tire pressure management system and associated axle spindle.

FIG. 3 is bottom plan view of the rotary union assembly of the present novel tire pressure management system.

FIG. 6 is a view in perspective of a push to connect fluid fitting of the rotary union assembly of FIG. 1.

FIG. 7 is a side elevation view of a pair of push to connect fluid fittings of the present novel tire pressure management system of FIG. 1.

DESCRIPTION OF PREFERRED EMBODIMENTS

Figure 4:
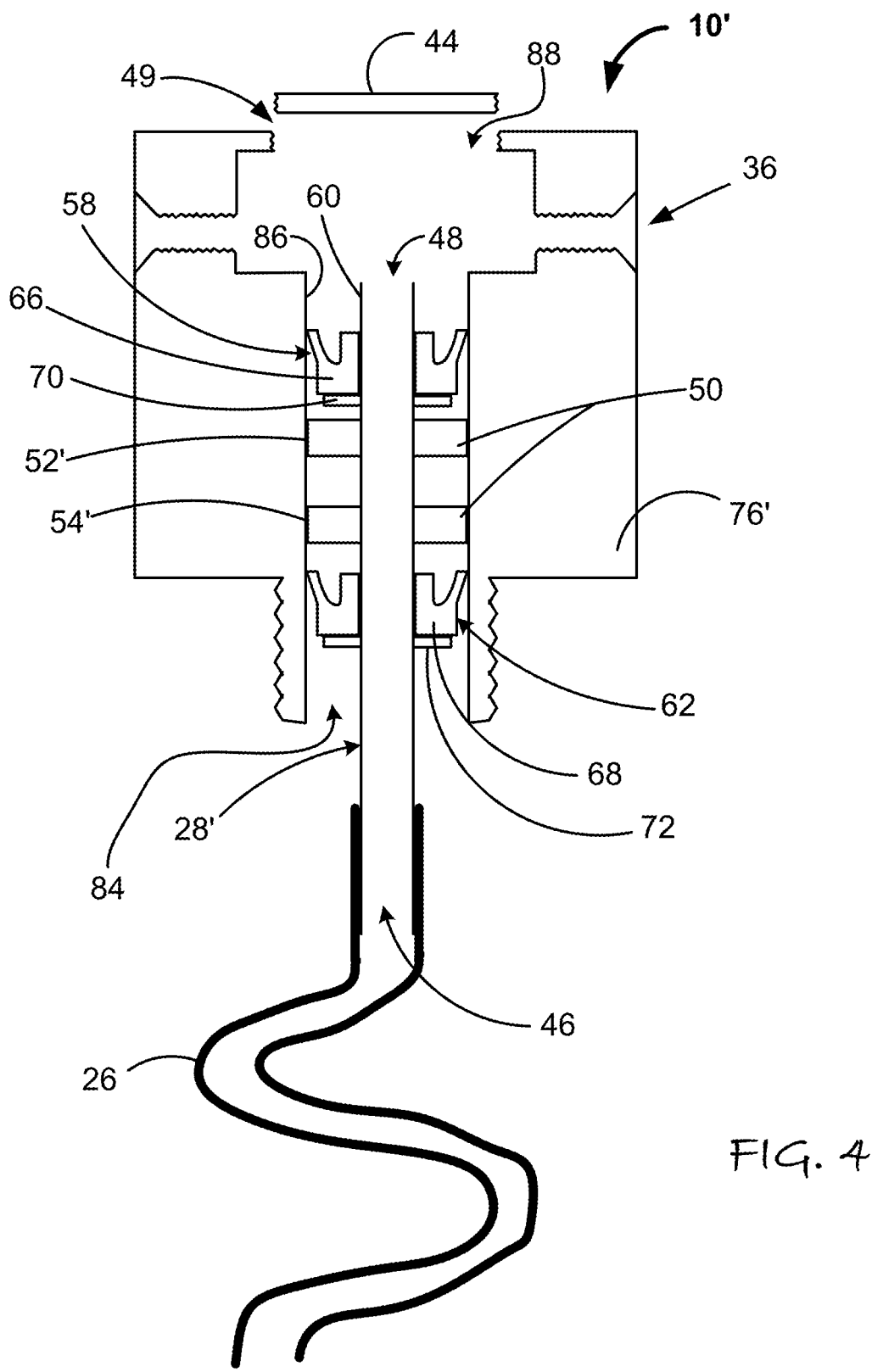
FIG. 4 is a cross-sectional side view of the rotary union housing, air lines and associated seals preferably employed by the present novel tire pressure management system.

It will be readily understood that elements of the present invention, as generally described and illustrated in the Figures herein, could be arranged and designed in a wide variety of different configurations. Referring now in detail to the drawings of the preferred embodiments, the rotary union assembly 10 (also referred to herein as assembly 10, and rotary union 10) of the first preferred embodiment, while useable on a wide variety of movable vehicles employing stationary axles for automatically maintaining the inflation pressure of the pneumatic tires thereon, is particularly adapted for use on tractor trailers. Accordingly, the assembly 10 of the first preferred embodiment will be described in conjunction with a pair of adjacent vehicle tires 12 and 14 mounted on a stationary tractor trailer axle 16 (also referred to herein as trailer axle 16, axle 16, and axle housing 16). While identical rotary union assemblies 10 are provided at the end of each axle on the trailer to maintain the inflation pressure of the tires carried thereby, in each: the preferred embodiment; the alternate preferred embodiment; and the alternative preferred embodiment, reference will be made to only one such assembly and the pair of tires it services.

Preferably, the trailer axle 16 which carries tires 12 and 14 is sealed and functions as a source for pressurized fluid, else houses an air supply line 18 to supply air to the rotary union assembly 10. A fluid supply line 20 preferably provides air under pressure to the interior of the axle 16, else to an air supply line 18, from the conventional air compressor on the tractor via a standard pressure protection valve and control box (not shown) to pressurize the axle 16, else to pressurize the air supply line 18, at the cold tire pressure of the trailer tires. FIG. 1 further shows that the axle 16 supports an axle plug 22, which in turn supports a push to connect fluid fitting 24. Preferably, the push to connect fluid fitting 24 is attached to and in fluid communication with a fill tube 26, which in a preferred embodiment is a flexible fill tube 26. Preferably, the flexible fill tube 26 is connected to a fluid conduit 26, which supplies pressurized air to the rotary union assembly 10. Preferably, the flexible fill tube 26 is secured to the fluid conduit 28 by a compression fitting 30. As those skilled in the art would know, a compression fitting, or alternate mechanical means, could serve the function of the push to connect fluid fitting 24.

In a preferred embodiment, the rotary union assembly 10 is mounted to a hubcap 32 from an exterior 34 of the hubcap 32 and provides pressurized air by way of an air delivery channel 36 to tire pressure hose fittings 38 that are secured to tire pressure hoses 40. Each tire pressure hose 40 supplies the pressurized air to tire valve stems 42 of tires 12 and 14. Preferably, the rotary union assembly 10 provides a removable seal access cover 44, which mitigates escapement of pressurized fluid from the air delivery channel 36, the tire pressure hoses 40, and the tires 12 and 14.

As seen in FIGS. 2 and 3, the fluid conduit 28 provides a downstream end 48 and an upstream end 46 and the rotary union assembly 10 further preferably includes a pair of bearings 50, in which each of the pair of bearings 50 provides an inner race and an outer race. In a preferred embodiment, a first bearing 52 of the pair of bearings 50 is adjacent the downstream end 48 of the fluid conduit 28 while the second bearing 54 of the pair of bearings 50 is adjacent the upstream end 46 of the fluid conduit 28.

FIG. 2 further shows that in a preferred embodiment, the rotary union assembly 10 further includes a pair of fluid seals 56 with a first fluid seal 58 is preferably disposed between the first bearing 52 and the downstream end 48 of the fluid conduit 28, while the second fluid seal 62 of the pair of fluid seals 56 is preferably disposed between the second bearing 54 and the upstream end 46 of the fluid conduit 28. In a preferred embodiment, the second fluid seal 62 mitigates transfer of an environment contained within an interior 64 of the hubcap 32 from entry into the pair of bearings 50.

FIG. 2 further shows that in a preferred embodiment, each of the pair of fluid seals 56 (58 and 62) provide a base portion (66 and 68 respectfully) and the rotary union assembly 10 further includes: a first fluid seal restraint 70, which is disposed between the first bearing 52 and the base portion 66 of the first fluid seal 58 and in pressing engagement with the external surface 60 of the fluid conduit 28; and a second fluid seal restraint 72, which is disposed between the base portion 68 of the second fluid seal 62 and in pressing engagement with the external surface 60 of the fluid conduit 28. FIG. 2 still further shows that the rotary union 10 preferably includes a bearing spacer 74 disposed between the first bearing 52 and the second bearing 54 of the pair of bearings 50. The bearing spacer 74 provides stability of the first and second bearings (52, 54) during the process of pressing the pair of bearings 50 into a rotary union housing 76 of the rotary union assembly 10.

As discussed hereinabove, in a preferred embodiment, the second fluid seal 62 mitigates transfer of an environment contained within an interior 64 of the hubcap 32 from entry into the pair of bearings 50. However, if the environment within the hubcap 32 elevates in pressure, a spring loaded pressure relief valve 78 (such as a poppet valve), else a pressure relief seal 80 (of FIG. 9) also referred to herein as a pressure equalization structure 80A (of FIG. 11), confined by an excess pressure collection chamber 82 (which is provided by the rotary union housing 76 and is in contact adjacency with the exterior 34 of the hubcap 32 and shown by FIGS. 2 and 3) activates to relieve the pressure present in the pressure collection chamber 82 to atmosphere. That is, when the pressure contained by the pressure collection chamber 82 reaches a predetermined pressure level, which in a preferred embodiment is in the range of 5 to 8 PSI.

FIG. 4 shows a preferred embodiment that preferably includes at least the rotary union housing 76' supporting and confining the fluid conduit 28' within a central bore 84 (also referred to herein as channel 84) of the rotary union housing 76'. The fluid conduit 28' preferably provides the downstream end 48 and the upstream end 46. Further shown by FIG. 4 is the pair of bearings 50; each of the pair of bearings 50 provides an inner race and an outer race. Each inner race of the pair of bearings 50 is in pressing communication with the external surface 60 of the fluid conduit 28' and each outer race of the pair of bearings 50 is in pressing communication with a bore surface 86 (also referred to herein as wall 86) of the central bore 84 of the rotary union housing 76'. The first bearing 52' of the pair of bearings 50 is adjacent the downstream end 48 of the fluid conduit 28' and the second bearing 54' of the pair of bearings 50 is adjacent the upstream end 46 of the fluid conduit 28'.

FIG. 4 further shows that in a preferred embodiment, the rotary union 10' preferably includes a pair of fluid seals 56, the first fluid seal 58 of the pair of fluid seals 56 engages the external surface 60 of the fluid conduit 28' and is disposed between the first bearing 52' and the downstream end 48 of said fluid conduit 28'. The second fluid seal 62 of the pair of fluid seals 56 engages the external surface 60 of the fluid conduit 28' and is disposed between said second bearing 54' and the upstream end 46 of the fluid conduit 28'. In a preferred embodiment, the first fluid seal 58 provides the base portion 66 and the first fluid seal restraint 70, which is in pressing contact with the external surface 60 of the fluid conduit 28', abuts against the base portion 66 of the first fluid seal 58 to maintain the relative position of the first fluid seal 58 adjacent the bore surface 86 of the central bore 84; and the second fluid seal 62 provides the base portion 68, and the second fluid seal restraint 72 which is in pressing contact with the external surface 60 of the fluid conduit 28', abuts against the base portion 68 of the second fluid seal 62 to maintain the relative position of the second fluid seal 62 adjacent the bore surface 86 of the central bore 84. In a preferred embodiment, the rotary union housing 76A further provides a fluid distribution chamber 88 (also referred to herein as a fluid chamber 88), which is in fluid communication with the downstream end 48 of the fluid conduit 28'. The fluid chamber 88 receives pressurized air from the fluid conduit 28' and transfers the received pressurized air to the tires 12 and 14 (of FIG. 1).

Figure 5:
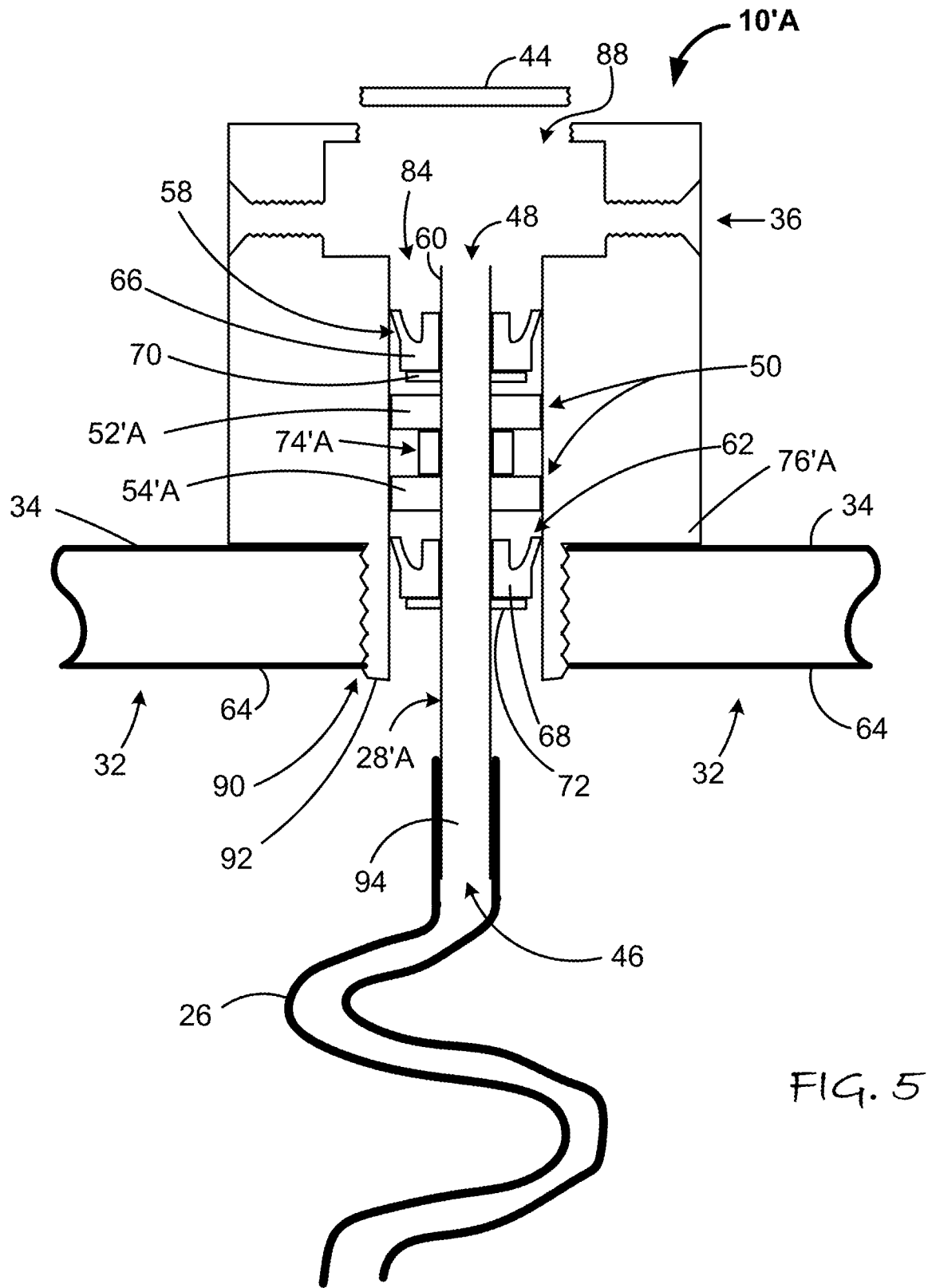
FIG. 5 is a cross-sectional side view of an alternate rotary union assembly of the present novel tire pressure management system and its associated bearings and bearing spacer.

FIG. 5 shows that in a preferred embodiment, the hubcap 32 provides an attachment aperture 90. The attachment aperture 90 is preferably disposed between the interior 64 and the exterior 34 of the hubcap 32. The attachment aperture 90 provides an axis of rotation, which is preferably substantially aligned with an axis of the axle 16 (of FIG. 1). Additionally, the rotary union housing 76'A provides at least an attachment member 92, which preferably is in mating communication with the attachment aperture 90. FIG. 5 further shows that the fluid conduit 28'A provides a fluid communication portion 94, which extends beyond the attachment member 92 and into the interior of said hubcap 32.

FIGS. 6 and 7 show the push to connect fluid fitting 24 of a preferred embodiment. The push to connect fitting, model No. 1868X4 by Eaton Weatherhead, of Maumee, Ohio is an example of a push to connect fitting of the type found useful in a preferred embodiment. FIG. 7 shows that in a preferred embodiment, two push to connect fluid fittings 24 are secured to the axle plug 22. In a preferred embodiment, one of the pair of push to connect fluid fittings 24 is in fluid communication with the air supply line 18, while the other is in fluid communication with the fill tube 26. FIG. 7 shows that in a preferred alternate embodiment, the axle plug 22 provides a pressure transfer conduit 96, which is used to disburse pressurized air, which may accumulate in the interior 64 of the hubcap 32 (both of FIG. 4) back into the axle housing 16 when the air supply line 18 is utilized to convey pressurized air to the rotary union 10 (of FIG. 2).

Figure 8:
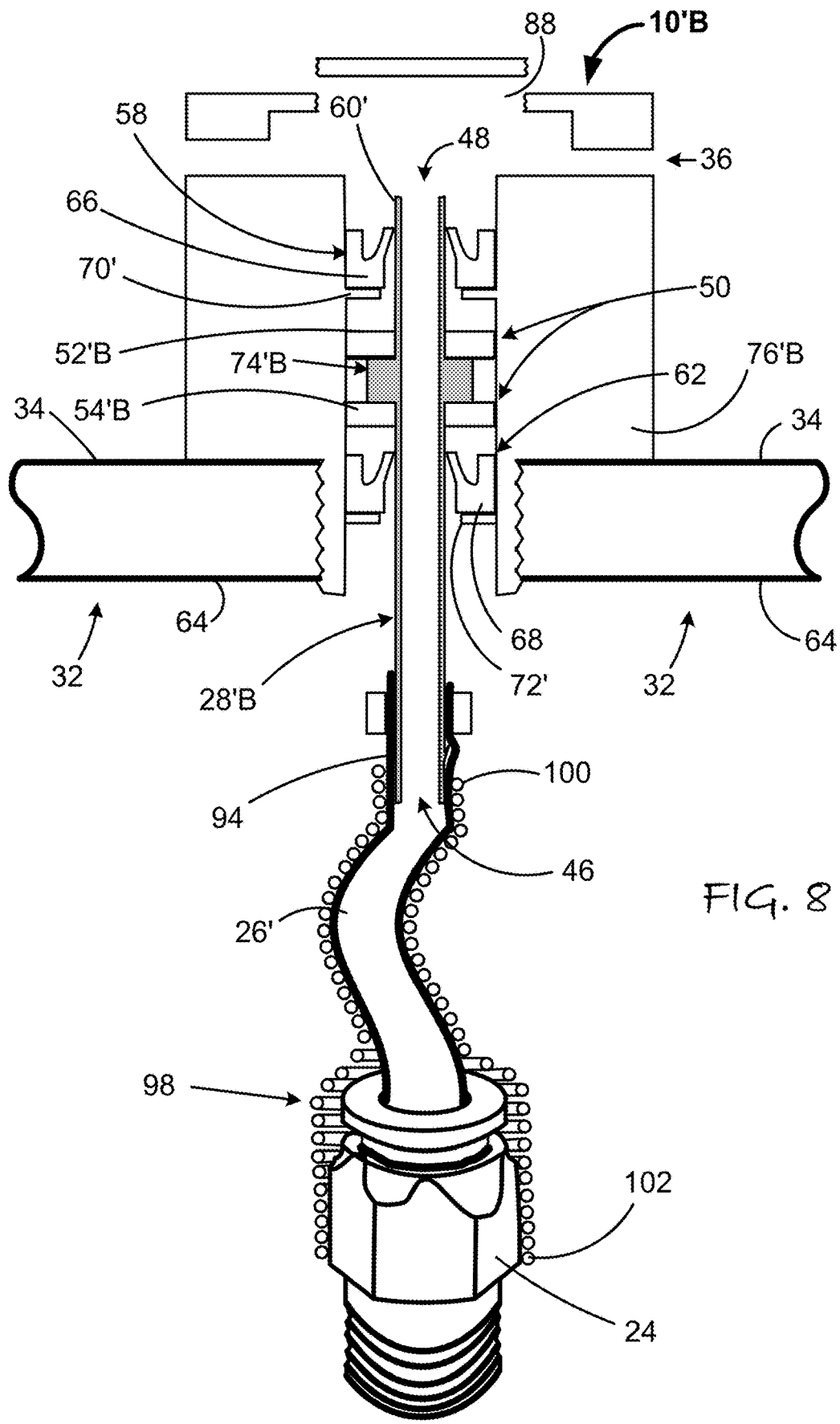
FIG. 8 is a cross-section view of the rotary union housing of an alternative rotary union assembly of the present novel tire pressure management system showing an anti-rotational means.

FIG. 8 depicts an alternate preferred embodiment of the present invention, in which the fluid conduit 28'B provides the bearing spacer 74'B and the rotary union housing 76'B provides the first fluid seal restraint 70', while a second restraint 72' is in pressing communication with wall 86 (of FIG. 4), of the central bore 84 (of FIG. 4). Additionally, in a preferred embodiment, the fill tube 26' is a flexible fill tube formed from a polymer, such as a polyurethane based material, else a metallic material, such as a shape memory alloy. FIG. 8 further shows that when the flexible fill tube 26' is connected to the push to connect fluid fitting 24, an anti-rotational means 98 is incorporated into the rotary union 10'B. Preferably, the anti-rotational means 98 has a first end 100 and a second end 102. The first end 100 of the anti-rotational means 98 is secured to the flexible fill tube 26' adjacent the fluid communication portion 94. The second end 102 of the anti-rotational means 98 connects to the push to connect fluid fitting 24. Preferably, the anti-rotational means 98 mitigates rotation of the fill tube 26' when the rotary union housing 76'B, in conjunction with the hubcap 32, rotates about the fluid conduit 28'. By example, but not by limitation, a coiled spring has been found useful as the anti-rotational means 98 in an alternate example, but not by way of limitation, a torsion bar 104 (of FIG. 9) has been found useful to serve as an anti-rotational means 98. However, as those skilled in the art will appreciate, any of a host of mechanical structures, which serve to mitigate rotation of the fill tube 26' when the rotary union housing 76'B, in conjunction with the hubcap 32, rotates about the fluid conduit 28'B may be employed to serve this purpose.

Figure 9:
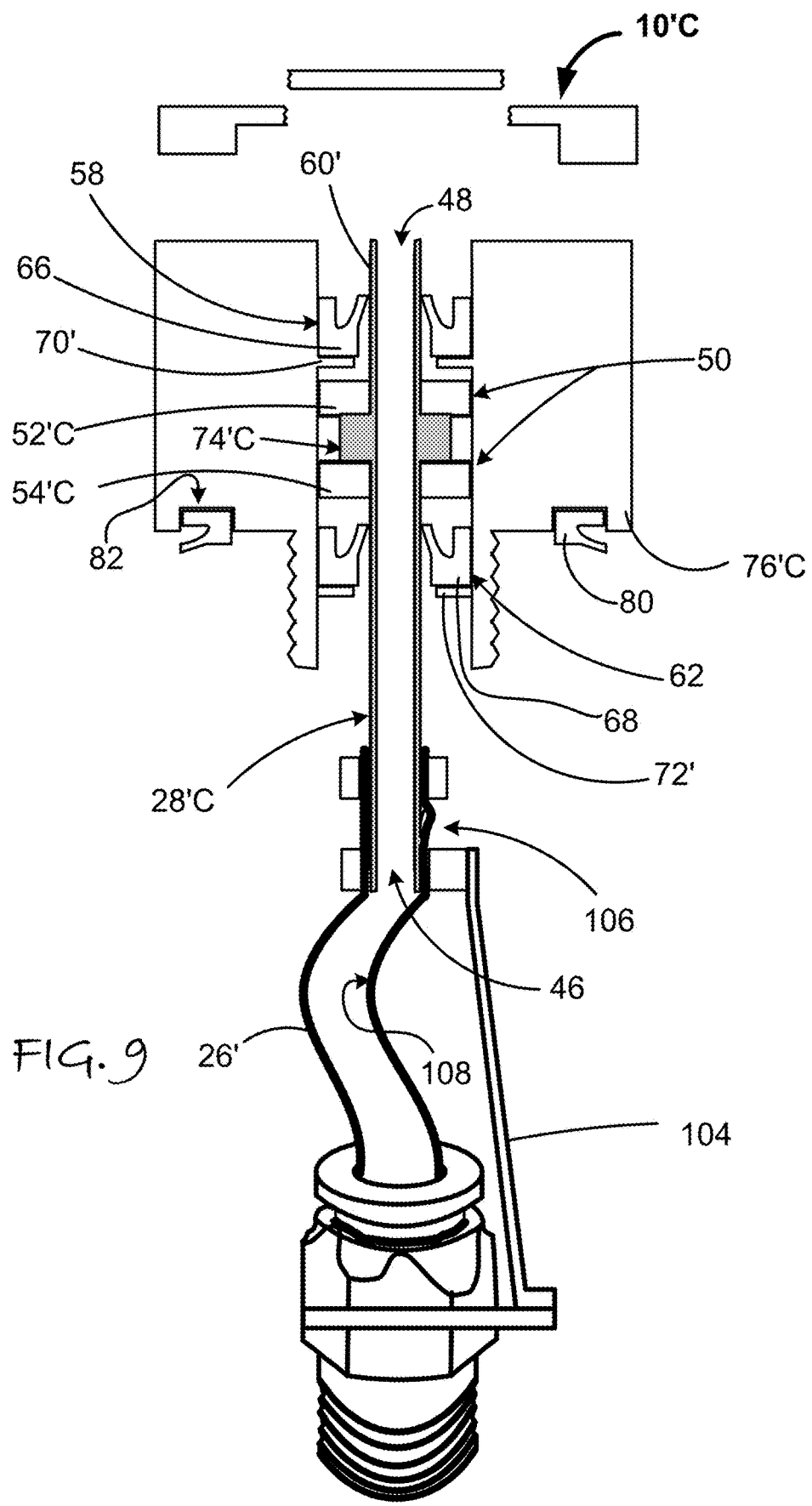
FIG. 9 is a cross-section view of the rotary union housing of the alternative rotary union assembly of FIG. 8, of the present novel tire pressure management system showing an alternate anti-rotational means.

In an alternate preferred embodiment, in addition to the fluid chamber 88, the rotary union housing 76'B further provides the air delivery channel 36, which is in fluid communication with, and extending radially from, said fluid chamber 88. As shown by FIG. 9, the fluid conduit 28'C further provides a retention barb 106 protruding from the fluid conduit 28'C and communicating with an interior surface 108 of said flexible fill tube 26'. The retention barb 106 mitigates an inadvertent removal of said flexible fill tube 26' from the fluid conduit 28'C. The retention barb 106 is preferably positioned adjacent to and downstream from the compression fitting 30, as shown by FIG. 2. FIG. 9 further shows that rotary union housing 76'C of rotary union assemble 10'C provides an excess pressure collection chamber 82, which supports a pressure equalization structure 80, which in combination mitigates a buildup of pressure which may leak around fluidic seal 58. And in an embodiment presented by FIG. 9, fluid conduit 28'C provides bearing spacer 74'C, which support each first bearing 52' and second bearing 54' of the pair of bearings 50.

Figure 10:
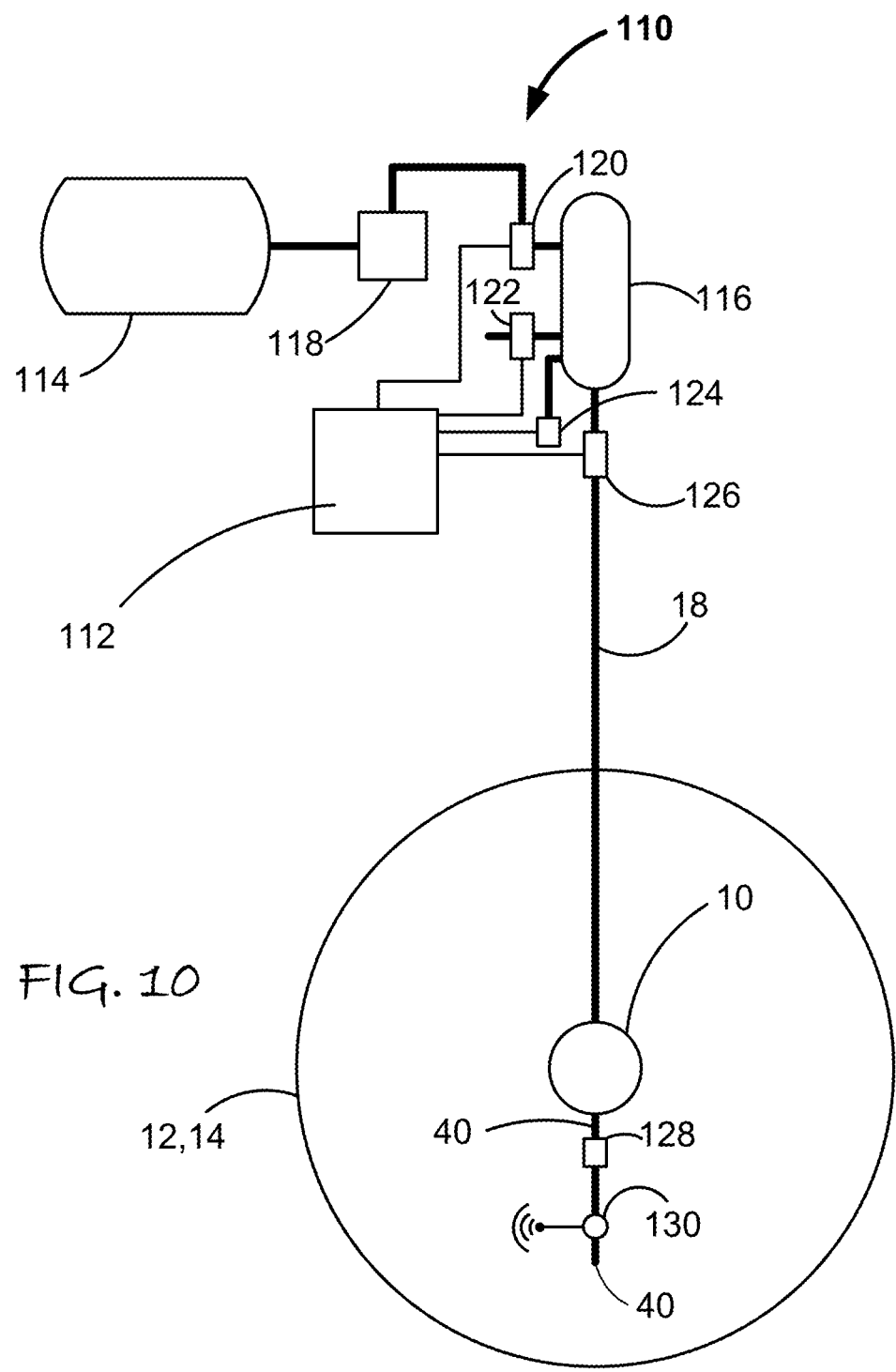
FIG. 10 is a block diagram of the present novel tire pressure management system of FIG. 1.

FIG. 10 shows a tire pressure management system 110, which preferably includes at least a fluid pressure controller 112, which in a preferred embodiment controls the flow of pressurized air into and out of the tires 12 and 14. The source of the pressurized air is a trailer air tank 114. The trailer air tank 114 is in fluidic communication with a tire pressure tank 116. The pressurized air from the trailer air tank 114 passes through an air regulator 118 and then through an air inlet control valve 120 operating under the control of the fluid pressure controller 112. In a preferred embodiment, the tire pressure management system 110 further includes at least: an air outlet valve 122 in fluid communication with the tire pressure tank 116 and under the control of the fluid pressure controller 112; a tire pressure tank pressure gauge 124 in fluid communication with the tire pressure tank 116 and in electronic communication with the fluid pressure controller 112; and an air pressure supply valve 126 in fluid communication with the tire pressure tank 116 and under the control of the fluid pressure controller 112. Preferably, the air pressure supply valve 126 supplies pressurized air to, or conversely, receives pressurized air from the air supply line 18, depending on whether the pressure in the tire (12, 14) is above or below a desired pressure level.

In a preferred embodiment, pressurized air that flows into or out of the rotary union 10 is modulated by a dual flow control valve 128. Preferably, the dual flow control valve 128 responds to air pressure supplied by the air supply line 18 by opening a spring loaded valve member, which allows pressurized air to flow out of the tire (12,14) when the pressure in the tire (12,14) is greater than the air pressure in the air supply line 18. Conversely, the dual flow control valve 128 promotes the flow of pressurized air into the tire (12, 14) when the pressure level within the tire 12, 14 is less than the air pressure in the air supply line 18.

FIG. 10 further shows that the tire pressure management system 110 further preferably includes a tire pressure monitoring sensor 130 disposed between the dual flow control valve 128 and the tire (12,14) and in electronic communication with the fluid pressure controller 112. In a preferred embodiment, the tire pressure monitoring sensor 130 measures the level of pressure within the tire (12, 14) and relays the measured pressure level to the fluid pressure controller 112. The fluid pressure controller 112 compares the measured pressure level within the tire (12, 14) to a target pressure, maintains the pressure available in the tire pressure tank 116 at the target level, and directs the air pressure supply valve 126 to release pressurized air to the dual flow control valve 128, which activates to promote either inflation, or deflation of the tire (12,14) to bring the pressure level within the tire (12,14) into balance with the target pressure level. Once the desired pressure level within the tire (12, 14) is achieved, as measured by the tire pressure monitoring sensor, the fluid pressure controller 112 directs the air pressure supply valve 126 to disengage.

In a preferred embodiment, the fluid pressure controller 112 operates both the air outlet valve 122 and the air inlet control valve 120 to maintain the pressure within the tire pressure tank 116 at a predetermined pressure level. For example, but not by way of limitation, if the tire pressure of the tires (12, 14) is above the target pressure level, the fluid pressure controller 112 will crack open the air outlet valve 122 to allow relief of pressure from the system; and if the tire pressure of the tires (12, 14) is below the target pressure level, the fluid pressure controller 112 will crack open the air inlet control valve 120 to allow pressure to build in the system.

Figure 11:
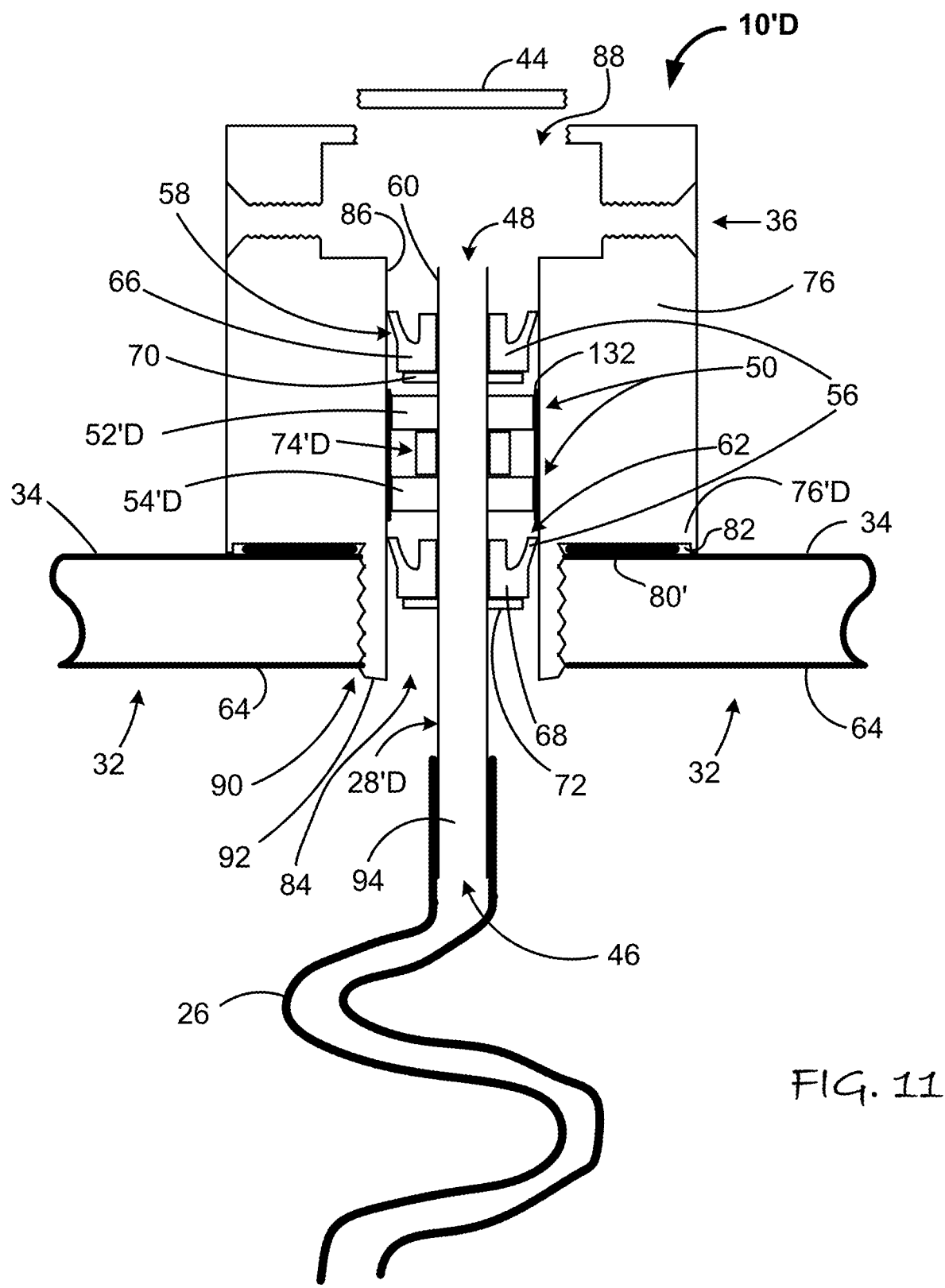
FIG. 11 is a cross-sectional side view of the rotary union housing, air lines, bearing sleeve, and associated seals preferably employed by the present novel tire pressure management system.

FIG. 11 shows a preferred embodiment that preferably includes at least the rotary union housing 76'D supporting and confining the fluid conduit 28'D within a central bore 84 (also referred to herein as channel 84 of FIG. 4 5) of the rotary union housing 76'D. The fluid conduit 28'D preferably provides the downstream end 48 and the upstream end 46. Further shown by FIG. 4 11 is the pair of bearings 50; each of the pair of bearings 50 provides an inner race and an outer race. Each inner race of the pair of bearings 50 is in pressing communication with the external surface 60 of the fluid conduit 28'D. The first bearing 52'D of the pair of bearings 50 is adjacent the downstream end 48 of the fluid conduit 28'D and the second bearing 54'D of the pair of bearings 50 is adjacent the upstream end 46, of the fluid conduit 28'D.

FIG. 11 further shows that in a preferred embodiment, the rotary union 10'D preferably includes a pair of fluid seals 56, the first fluid seal 58 of the pair of fluid seals 56 engages the external surface 60 of the fluid conduit 28'D and is disposed between the first bearing 52'D and the downstream end 48 of said fluid conduit 28'D. The second fluid seal 62 of the pair of fluid seals 56 engages the external surface 60 of the fluid conduit 28'D and is disposed between said second bearing 54'D and the upstream end 46 of the fluid conduit 28'D. In a preferred embodiment, the first fluid seal 58 provides the base portion 66 and the first fluid seal restraint 70, which is in pressing contact with the external surface 60 of the fluid conduit 28'D, abuts against the base portion 66 of the first fluid seal 58 to maintain the relative position of the first fluid seal 58 adjacent the bore surface 86 of the central bore 84 (each of FIG. 4); and the second fluid seal 62 provides the base portion 68 and the second fluid seal restraint 72, which is in pressing contact with the external surface 60 of the fluid conduit 28'D, abuts against the base portion 68 of the second fluid seal 62 to maintain the relative position of the second fluid seal 62 adjacent the bore surface 86 of the central bore 84 (each of FIG. 4). In a preferred embodiment, the rotary union housing 76'D further provides a fluid distribution chamber 88 (also referred to herein as a fluid chamber 88), which is in fluid communication with the downstream end 48 of the fluid conduit 28'D. The fluid chamber 88 receives pressurized air from the fluid conduit 28'D and transfers the received pressurized air to the tires 12 and 14 (of FIG. 1). Additionally, the rotary union housing 76'D provides at least the attachment member 92, which preferably is in mating communication with the attachment aperture 90 of the hubcap 32 and further shows that the fluid conduit 28'D provides a fluid communication portion 94, which extends beyond the attachment member 92 and into the interior of said hubcap 32.

In a preferred embodiment, the rotary union 10'D preferably includes a bearing sleeve 132, and the bearing sleeve 132 is preferably in pressing contact with the central bore 84, or may be joined to the central bore 84, of the rotary union housing 76'D by means of the use of an adhesive, weld, solder, or other mechanical joint techniques, such as through an insert molding process.

Preferably, the pair of bearings 50 each provide an inner race and an outer race, each inner race of the pair of bearings 50 is preferably in direct contact adjacency with the external surface 60 of the fluid conduit 28'D, while the outer race of each of the pair of bearings 50 are preferably in pressing communication with the internal surface of the bearing sleeve 132. The bearing sleeve 132 may be formed from a composite material; a metallic material (such as, but not limited to brass, aluminum, stainless steel, iron or steel); or from a polymeric materials (such as, but not limited to nylon, Delran™, phenolic, or Teflon™).

As further shown by FIG. 11, an excess pressure collection chamber 82 is provided by the rotary union housing. The excess pressure collection chamber 82 is preferably adjacent the exterior 34 of the hubcap 32 and serves to accommodate a pressure equalization structure 80'. The pressure equalization structure 80' is preferably disposed within the excess pressure collection chamber 82 and in contact adjacency with the exterior 34 of the hubcap 32. As is shown in FIGS. 9 and 11, the mechanical configuration of the cooperation between the pressure equalization structure 80' and the excess pressure collection chamber 82 may take on a plurality of forms.

Additionally, the preferred embodiment of FIG. 11 further shows that the pair of fluid seals 56 are simultaneously present within the rotary union assembly 10'D and that bearing spacer 74'D is an independent structure from and forms no portion of the bearing sleeve 132. The first seal 58 and second seal 68 of the pair of fluid seals 56 each form a rotary seal between said external surface 60 of the fluid conduit 28'D and the bore surface 86 of the central bore 84 (also shown in FIG. 4)

Figure 12:
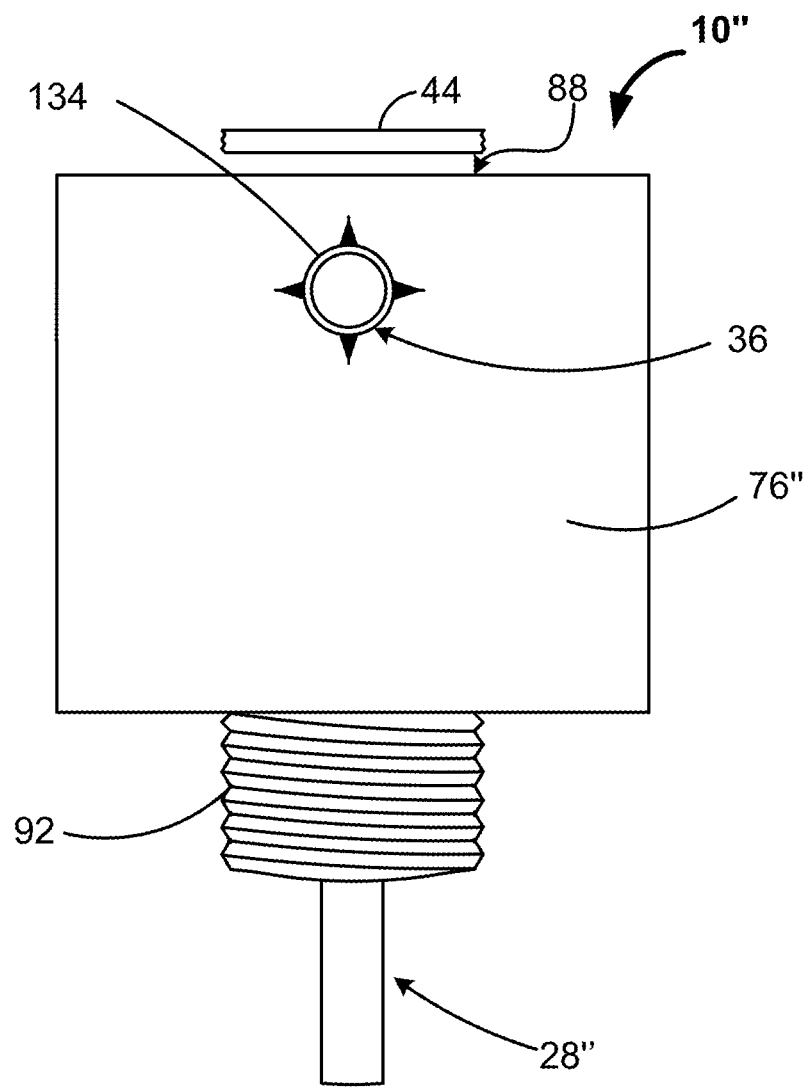
FIG. 12 is a side view in elevation of a rotary union housing formed from a polymer, and providing a threaded insert molded into the polymer rotary housing.

FIG. 12 shows a side view in elevation of a rotary union housing 76" of rotary union assembly 10" formed from a polymeric materials (such as, but not limited to nylon, Delran™, phenolic, or Teflon™) and providing a threaded insert 134, the threaded insert 134 molded into the polymer rotary housing 76" confined within the air delivery channel 36 and in fluidic communication with the fluid chamber 88.

Figure 13:
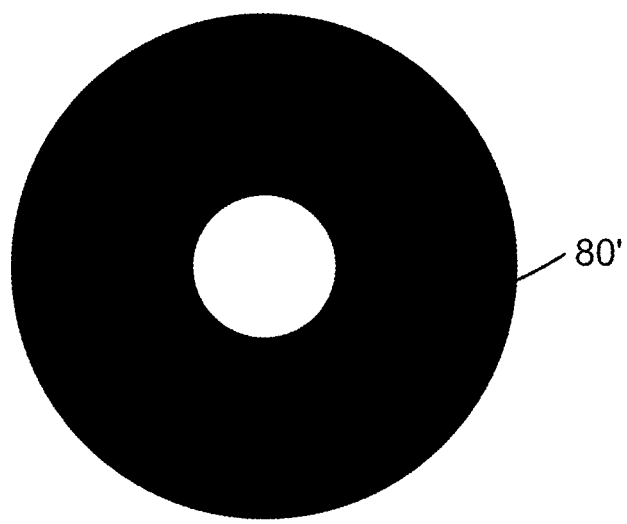
FIG. 13 is a top plan view of a pressure equalization structure of FIG. 11.

FIG. 13 shows a top plan view of the pressure equalization structure 80' of FIG. 11. In a preferred embodiment, the pressure equalization structure 80' is a filter material (of metal, fiber, or polymer, such as, but not limited to spun bonded polypropylene) as a top layer, and a bottom layer is preferably formed from flashspun high-density polyethylene fibers that promotes the transfer of air, while mitigating the transfer of dirt and water.

Figure 14:
FIG. 14 is a side view in elevation of an embodiment of the pressure equalization structure of FIG. 13.
Figure 15:
FIG. 15 is a side view in elevation of an alternate embodiment of the pressure equalization structure of FIG. 13.
Figure 16:
FIG. 16 is a side view in elevation of an alternative embodiment of the pressure equalization structure of FIG. 13.

FIG. 14, shows a side view in elevation of a preferred component of the bottom layer 136 of the pressure equalization structure 80' of FIG. 13. While FIG. 15 shows a side view in elevation of a preferred component of the top layer 138 of the pressure equalization structure 80' of FIG. 13. And FIG. 16 shows a side view in elevation of a combination 140 of the preferred bottom layer 136 applied to an external surface of the top layer 138.

Figure 17:
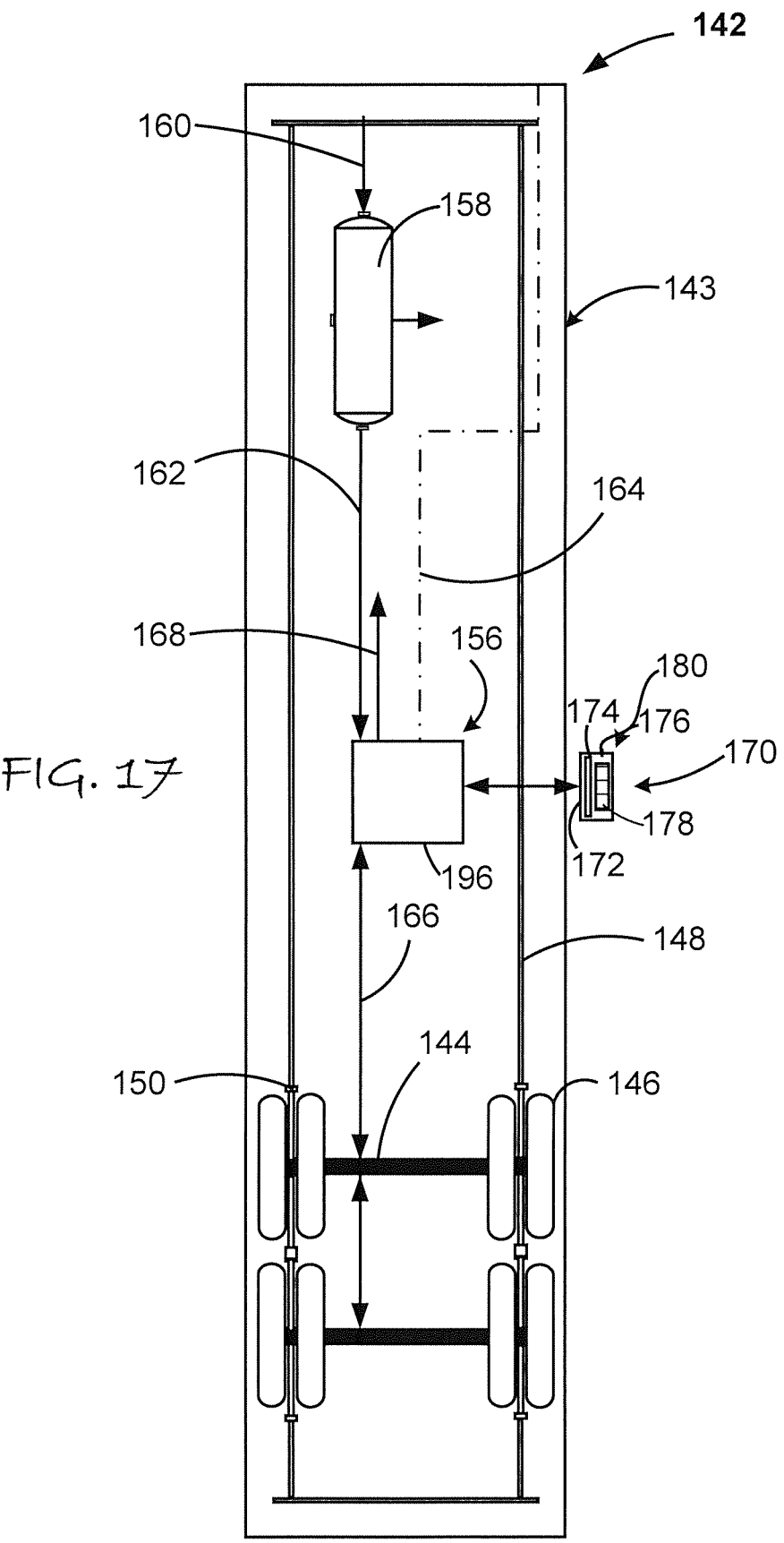
FIG. 17 is a bottom plan view of a trailer, featuring a leaf spring suspension.

FIG. 17 shows a bottom view of a dynamic wheel management system ("DWMS") 142, of the present subject matter. In a preferred embodiment, the DWMS 142 includes at least a trailer 143, supported by an axle 144, the axle 144, housing a pressurized fluid, and supported by a tire 146, and a vehicle frame 148, supported by the axle 144. In a preferred embodiment, a suspension, is disposed between and secured to each the vehicle frame 148, and the axle 144. The suspension may take the form of an air suspension system 152 (of FIG. 18), or a leaf spring suspension 154 (of FIGS. 19 and 20).

In a preferred embodiment the DWMS 142, further include: a pressure management controller 156, supported by the vehicle frame 148, and communicating with the tire 146; a load detection device 158' and 158" respectfully (of FIGS. 19 and 20), interacting with the suspension 150, and communicating with the pressure management controller 156. A further element of the preferred embodiment is a hubcap 32, (of FIG. 11), which is preferable supported by the axle 144, and has an interior 64, and an exterior 34. Preferably, the DWMS 142, further include a rotary union 10 (of FIG. 1), axially aligned with the axle 144, and mounted to the hubcap 32, from the exterior 64, of the hubcap 32. The rotary union 10, preferably including at least a rotary union housing 76 (of FIG. 6). The rotary union housing 76, provides at least a fluid distribution chamber 88 (of FIG. 6), and a central bore 84. The central bore 84, providing an internal surface and a portion of the fluid distribution chamber 88.

FIG. 17 further shows a fluid supply tank 158, which preferably receives a pressurized fluid from a compressor by way of the fluid supply line 160. Preferably, the fluid supply tank 158 provided fluid to the pressure management controller 156, by way of a system supply line 162, and power is supplied to the pressure management controller 156 by way of a power line 164. The pressure management controller 156, preferably manages a fluid pressure in the tire 146 through use of a fluid line 166, which supports a bidirectional fluid flow between the tire 146, and when necessitated, relives tire pressure to the atmosphere through exhaust line 168.

FIG. 17 further shows a system programming device 170, in communication with the pressure management controller 156. In a preferred embodiment, but not by way of a limitation, the system programming device 170, provides: an information input/output circuit 172, which is used to communicate with the pressure management controller 156; an information display screen 174, interacting with the information input/output circuit 172; and an information input device 176, which may be, but is not limited to, a keyboard 178, or a memory information device 180, such as a memory stick.

Figure 18:
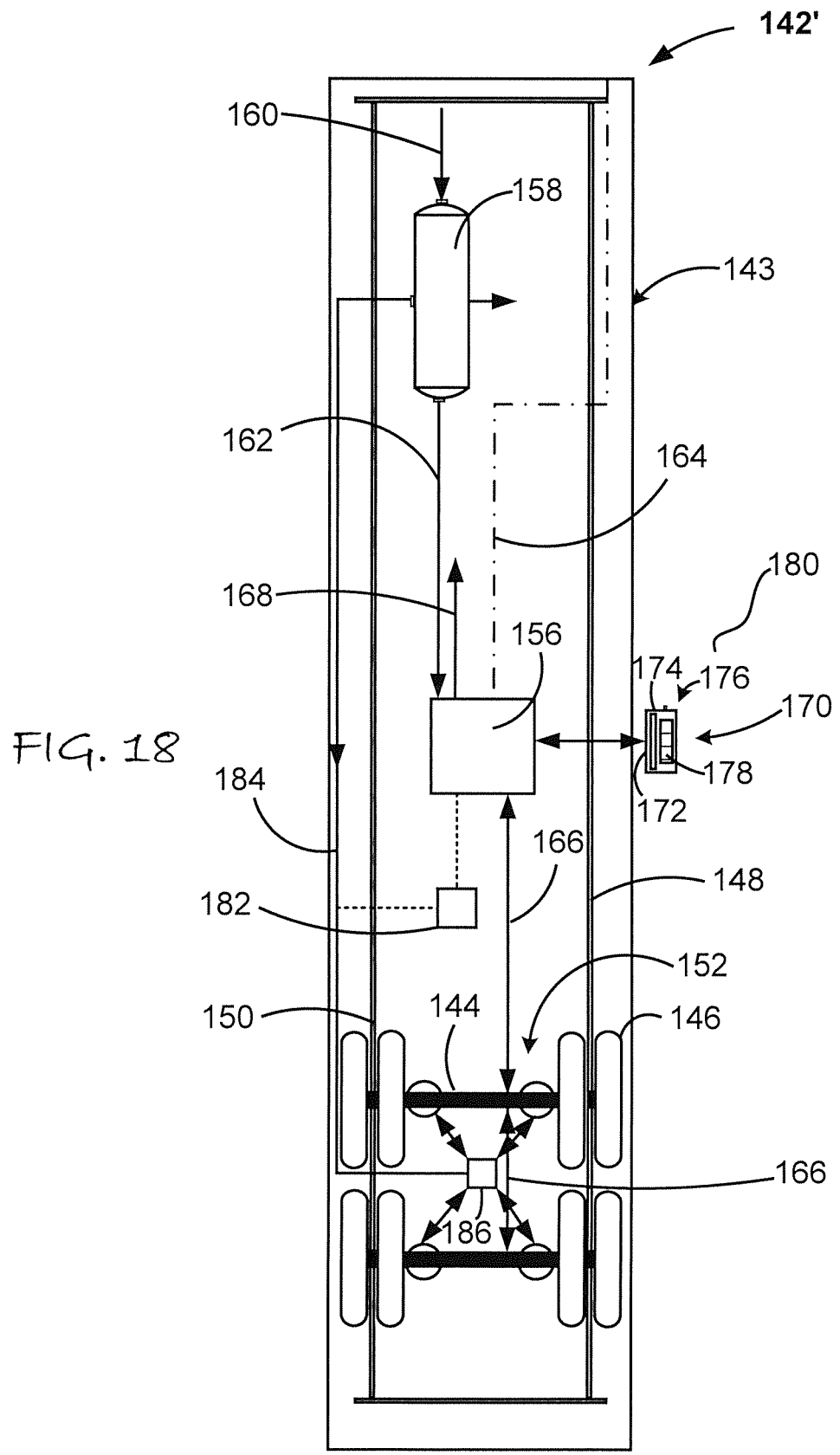
FIG. 18 is a bottom plan view of a tractor trailer, featuring an air bag suspension.

FIG. 18 shows a bottom view of a dynamic wheel management system ("DWMS") 142', of the present subject matter. It differs from FIG. 17 in that it shows an inclusion of a temperature/pressure transducer 182, disposed between, and communicating with, a suspension fluid supply line 184, and an air suspension control device 186. The suspension fluid supply line 184, supplying a fluid to the air suspension control device 186, from the fluid supply tank 158.

Figure 19:
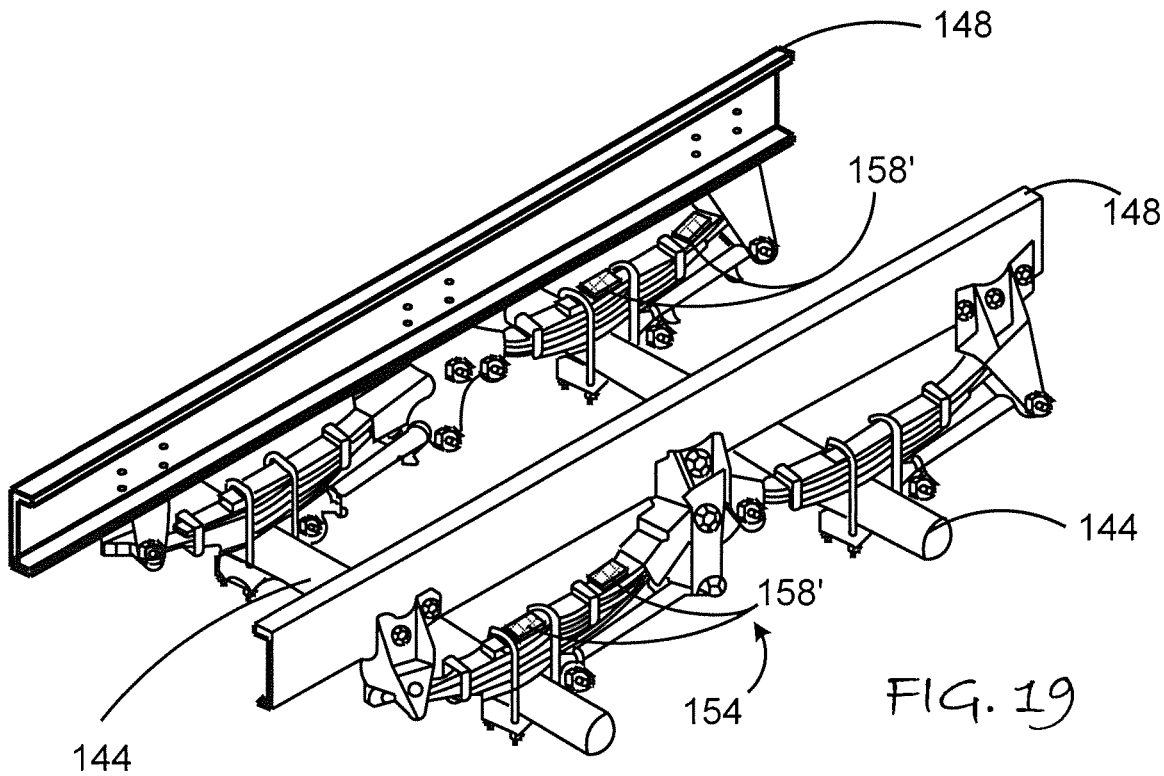
FIG. 19 is a partial view in perspective of the trailer of FIG. 17, showing the leaf springs outfitted with strain gauges.
Figure 20:
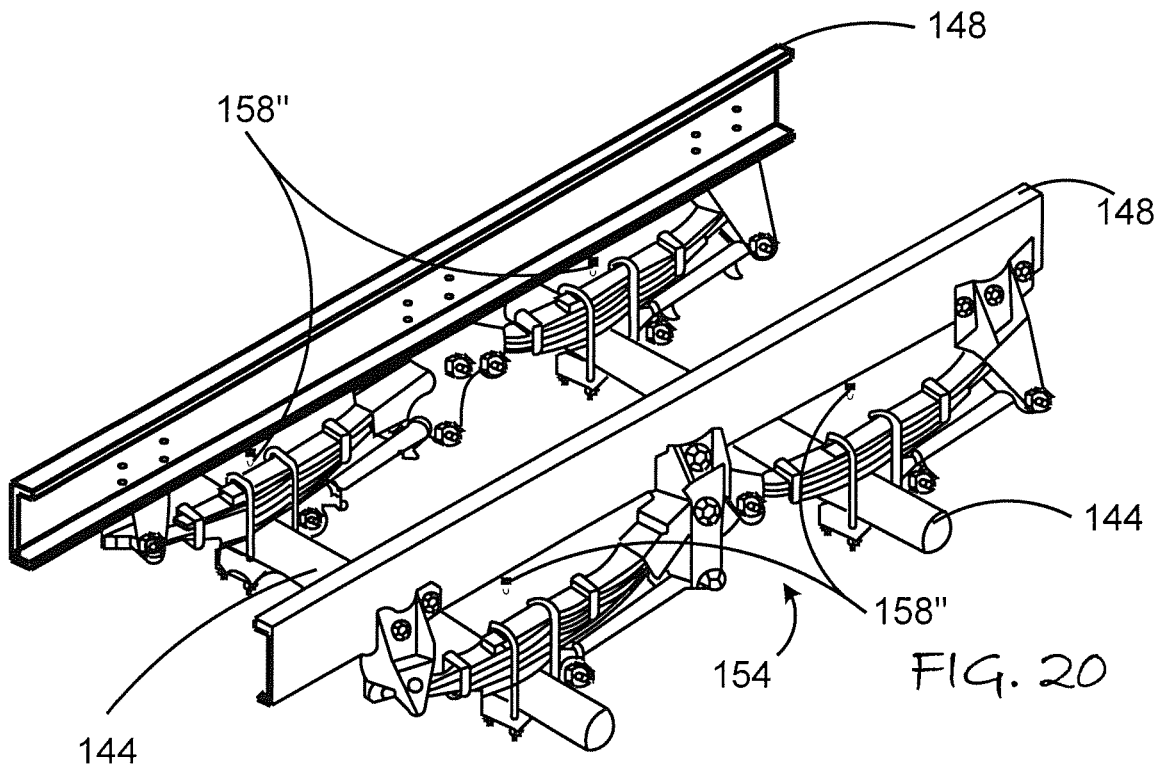
FIG. 20 is a partial view in perspective of the trailer of FIG. 17, showing the leaf springs outfitted with proximity sensors.

FIGS. 19 and 20 show the vehicle frame 148, supported by the axle 144 by way of the suspension 154, and a load detection device, which as shown by FIG. 19, the load detection device 158' is preferably a strain gauge secured to a leaf spring type suspension, and as shown by FIG. 20, the load detection device 158" is a proximity sensor. The proximity sensor, without limitations, may be selected from inductive, capacitive, magnetic, ultrasonic, and photoelectric type sensors. In a preferred embodiment, the proximity sensors are secured to the vehicle frame 148, and communicate with the leaf spring suspension.

Figure 21:
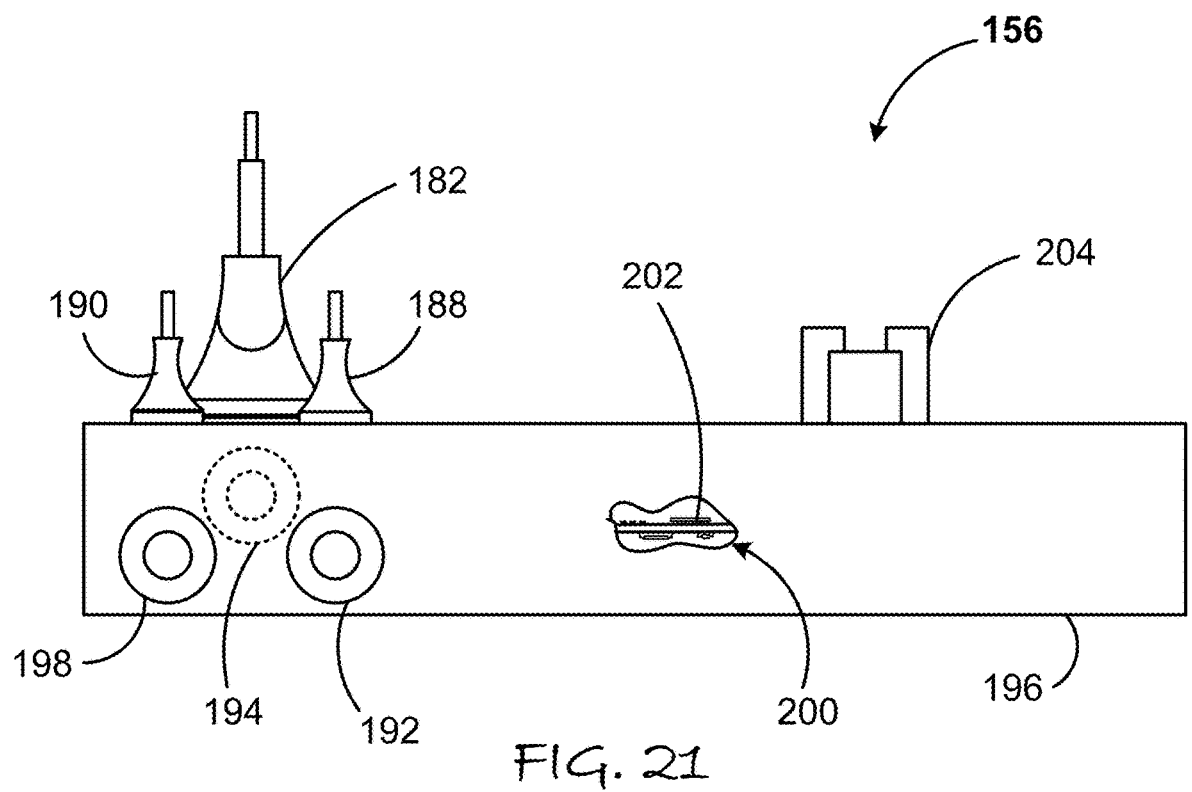
FIG. 21 is a partial cutaway a view in elevation of a pressure management controller of the present dynamic wheel management system.

FIG. 21 shows the pressure management controller 156, which preferably includes the temperature/pressure transducer 182, a pair of pneumatic piston valves 188 and 190. Pneumatic piston valve 188, cooperates with, and is disposed between, a fluid inlet port 192, and a fluid inflate and deflate port 194 (shown in dashed lines, as the fluid inflate and deflate port 194 is on an opposite side of a confinement structure 196 {also referred to herein as a housing 196}, than is the fluid inlet port 192). The fluid inflate and deflate port 194 interacts with the tire 146 to either provide fluid to the tire 146, when the tire 146 requires inflation, or when the tire requires deflation, to maintain the tire pressure at a desired value.

Pneumatic piston valve 190, cooperates with, and is disposed between, a fluid exhaust port 198, and the fluid inflate and deflate port 194. When a deflation of tire 146 is needed to maintain the fluid pressure at a desired level, fluid from the tire 146 flows through the fluid inflate and deflate port 194, and the pneumatic piston valve 190, to the exhaust port 198, where it is released to atmosphere.

FIG. 21 further shows that the housing 196, further houses a control electronics assembly 200, which receives input from the temperature/pressure transducer 182, and utilizes that input, in conjunction with control logic loaded into a central processing unit ("CPU") 202 to manage the pressure in the tire 146, to maintain the fluid pressure within the tire 146, at the desired level. In a preferred embodiment, control logic contained within the CPU 202, is provided by the system programming device 170 (of FIGS. 17 and 18).

The housing 196 further preferably supports a power/data/controller area network ("CAN") connector 204. The power/ data/CAN connector 204, preferably receives power from the power line 164 (of FIGS. 17 and 18), receives input from the system programming device 170, when the system programming device 170 is communicating with the CPU 202, and provides output data from the CPU 202 by way of the CAN connection of the power/data/CAN connector 204.

Figure 22:
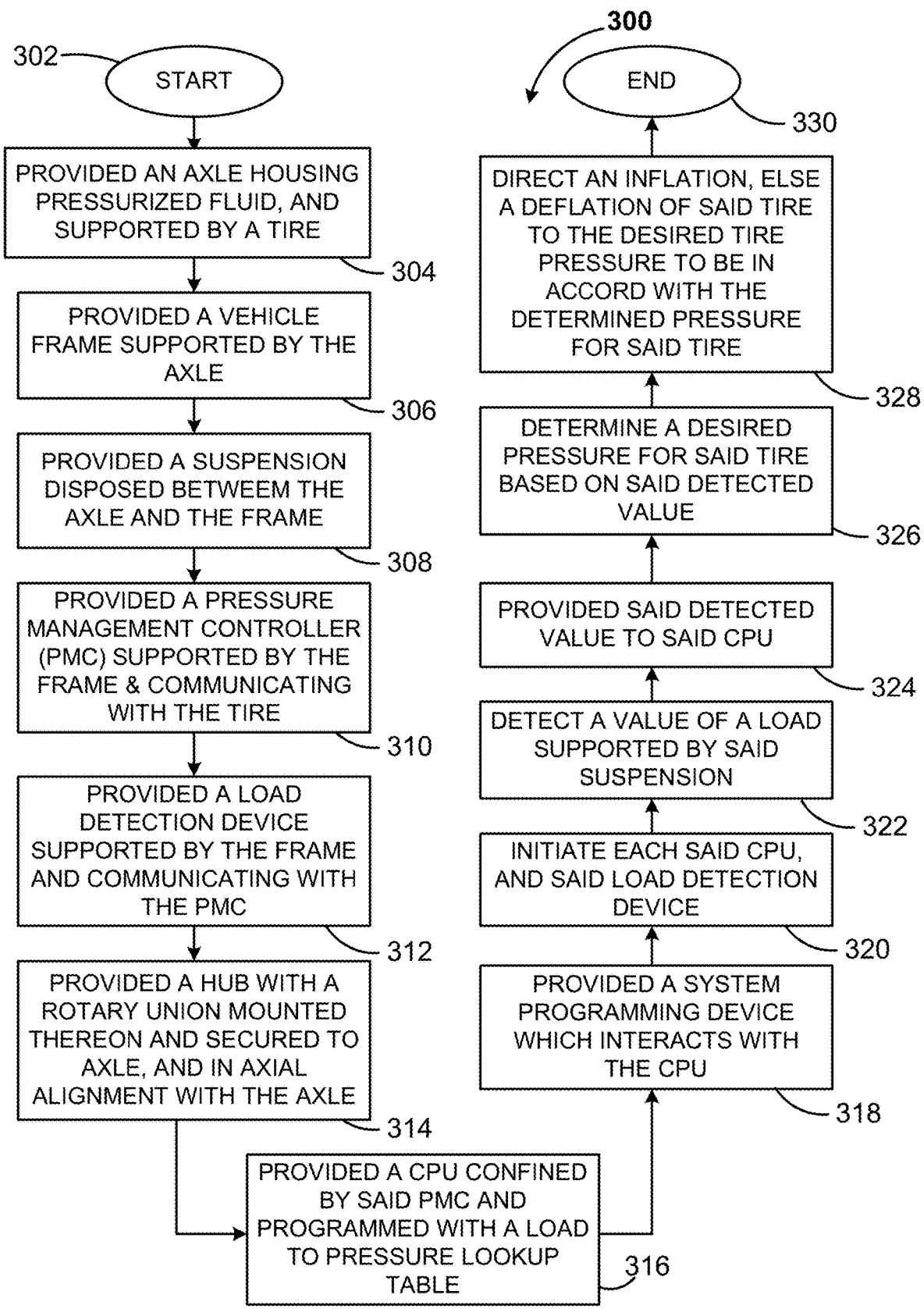
FIG. 22 is a flow diagram of a method of using the present dynamic wheel management system.

FIG. 22 is a flow diagram 300 of a method of using the present dynamic wheel management system 142 (of FIG. 17). The method begins at start step 302, and continues process step 304, at which an axle (such as 16, of FIG. 1) is provided. The axle preferably houses a pressurized fluid, in which the axle itself may confine the pressurized fluid, or the axle may house an air supply line (such as 18, of FIG. 1) that in turn confines the pressurized fluid. The axle is preferably supported by a tire (such as 146, of FIG. 17. At process step 304, a vehicle frame (such as 148, of FIG. 17) is provided, which in a preferred embodiment, is supported by the axle, and at process step 306, a suspension (such as air suspension system 152 (of FIG. 18), or a leaf spring suspension 154 (of FIGS. 19 and 20)) is provided. In a preferred embodiment, the suspension is disposed between the vehicle frame and the axle.

At process step 310, a pressure management controller ("PMC") (such as 156, of FIG. 18) is provided. In a preferred embodiment, the PMC is supported by the frame and communicates with the tire. While at process step 312, a load detection device (such as 158, of FIGS. 19 and 20) is provided. Preferably, the load detection device is supported by the frame, detects changes in the suspension, which is in response to loads being placed in the vehicle, and communicates those changes to the CPU, which is provided in process step 315, and is preferably confined by the PMC. The CPU analyses the communication from the load detection device and determines a desired pressure for the tire.

At process step 314, a hub, with a rotary union (such as 10, of FIG. 11) mounted thereto, is provided. In a preferred embodiment, the hub is mounted to the axle, and the rotary union is preferably positioned in axial alignment with the axis of the axle. At process step 318, a system programming device (such as 170, of FIG. 18) is provided. In a preferred embodiment, the system programming device is, when connected to the PMC, is utilized to up load operational software, and data used by the PMC during active operation of the PMC.

At process step 320, both the CPU and the load detection device is initiated. At process step 322, the load detection device determines the condition of the suspension, and generates a value. And at process step 324, the load detection device provides that value to the CPU. Again, the value provided is reflective of a load being supported by the suspension. At process step 326, the CPU determines a pressure value for use in the tire, based on the value detected and provided by the load detection device.

At process step 328, the PMC directs an inflation else a deflation of the tire to the desired pressure level for the tire, based on and in accordance with, the determined pressure value, and the process concludes at end process step 330.

Figure 23:
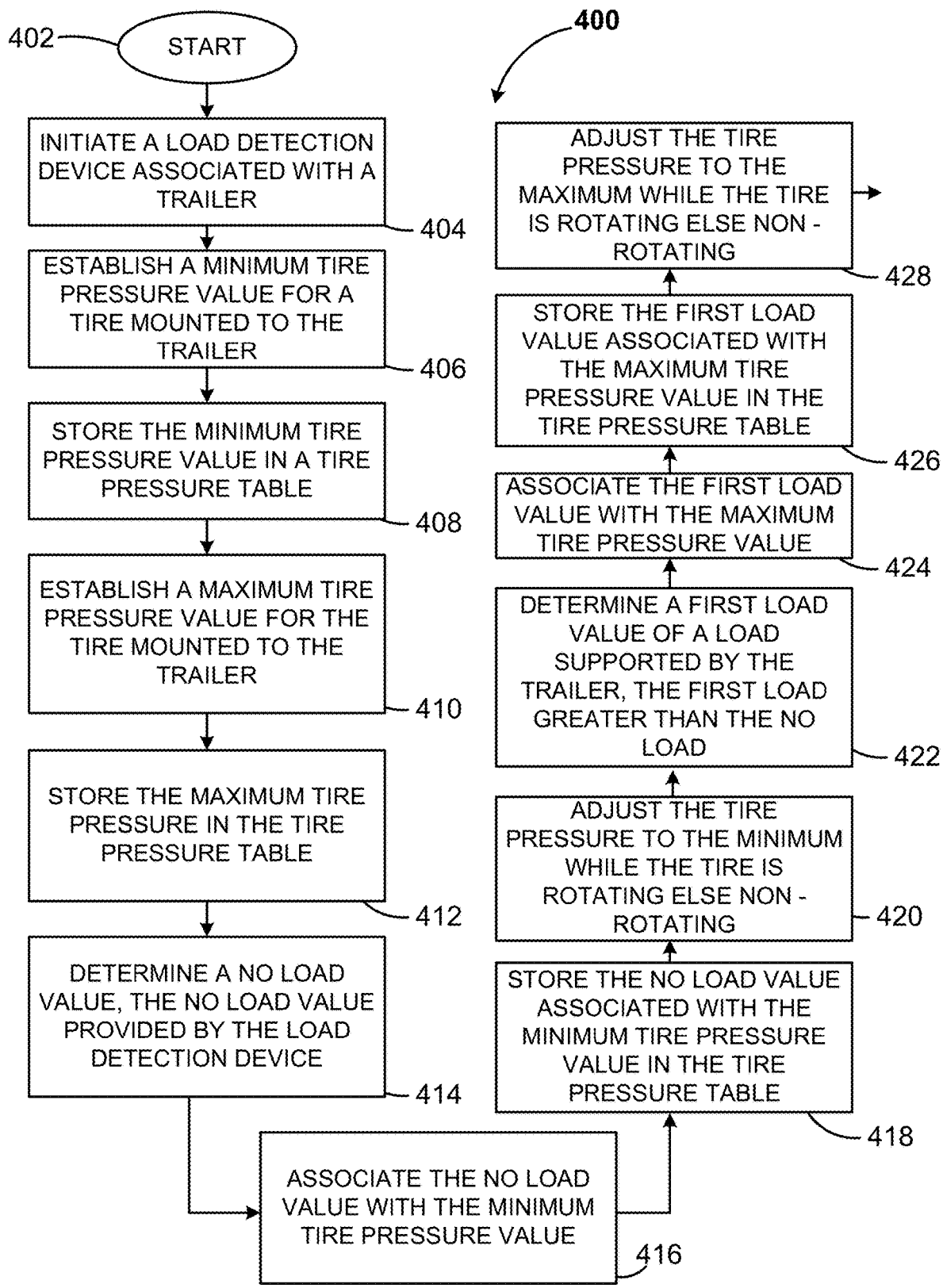
FIG. 23 is a flow diagram of a method of producing and using a tire pressure table of the present dynamic wheel management system.
Figure 24:
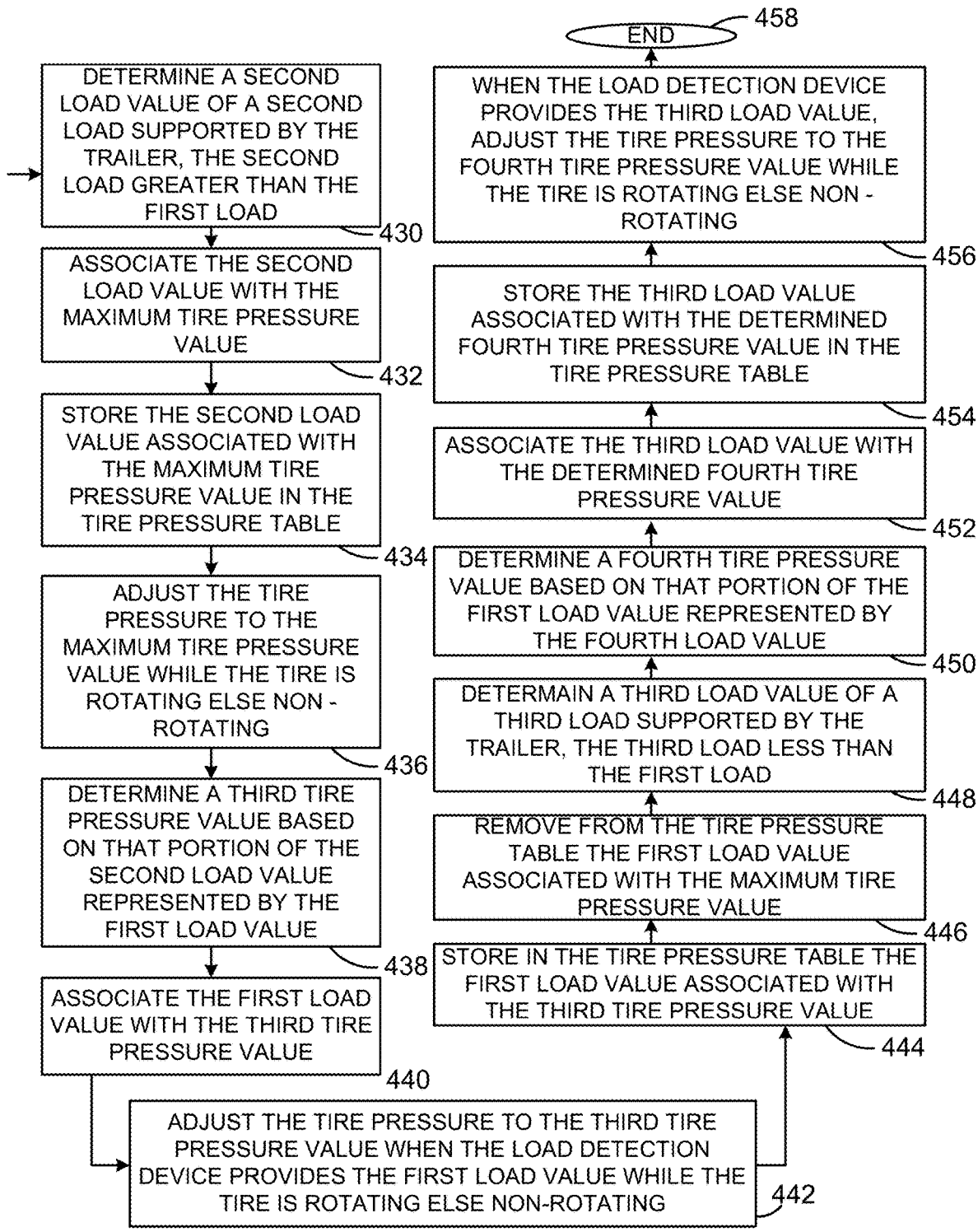
FIG. 24 is continuation of the flow diagram of a method of producing and using a tire pressure table of the present dynamic wheel management system of FIG. 23.

FIGS. 23 and 24 show a flow diagram of a process 400, of using the present dynamic wheel management system ("DWMS") (such as 142, of FIGS. 17 and 18). Process 400 commences at start step 402, and continues with process step 404. At process step 404 a load detection device associated with a vehicle (also referred to herein as trailer, of DWMS 142).

The process preferably continues at process step 406, a minimum tire pressure value is established for a tire mounted to the trailer. At process step 408, the minimum tire pressure is stored in a tire pressure table (also referred to herein as a tire table) contained within a CPU (such as 202, of FIG. 21), confined within a housing (such as 196, of FIG. 21), of a PMC (such as 156, of FIG. 21). At process step 410, a maximum tire pressure value for the tire is established, and stored in the tire table contained within the CPU at process step 412.

At process step 414, a no load value is determined by the load detection device, and associated with the minimum tire pressure value in the tire table at process strep 416, and further stored within the tire table at process step 418. At process step 420, the tire pressure is adjusted to comply with the minimum tire pressure when the no load value is provided to the CPU. Adjustment of the tire pressure may occur while the tire is rotating, or non-rotating.

At process step 422, a first load value, reflective of a first load being loaded on the trailer and supported by the suspension of the trailer, is determined, wherein the first load is greater in weight than the no load condition. At process step 424, the first load value is associated with the maximum tire pressure value, stored in the tire table of the CPU at process step 426, and at process step 428, the tire pressure is adjusted to comply with the maximum tire pressure when the first load value is provided to the CPU. Adjustment of the tire pressure may occur while the tire is rotating, or non-rotating.

The process continues with process step 430, of FIG. 24. At process step 430, a second load value is determined for a second load supported by the trailer, in which the second load is greater than the first load. At process step 432, the second load value is associated with the maximum tire pressure value, stored in the tire table at process step 434, and at process step 436, the tire pressure is adjusted to comply with the maximum tire pressure when the second load value is provided to the CPU. Adjustment of the tire pressure may occur while the tire is rotating, or non-rotating.

At process step 438, a third tire pressure is calculated by the CPU, based on that portion of second load value represented by the first load value. At process step 440, the first load value is associated with the determined third tire pressure value, stored in the tire table at process step 444, and at process step 442 the tire pressure is adjusted to comply with the determined third tire pressure value, when the load detected by the load detection device provides the first load value to the CPU. Adjustment of the tire pressure may occur while the tire is rotating, or non-rotating. And at process step 446, the first load value associated with the maximum tire pressure is removed from the tire table.

At process step 448, a third load value of a third load is determined, wherein the weight of third load is less than the first load. At process step 450, a fourth tire pressure value, based on that portion of the first load value represented by the fourth load value, is determined by the CPU. At process step 452, the third load value is associated with the determined fourth pressure value, stored in the tire table at process step 454, and at process step 456, the tire pressure is adjusted to comply with the determined fourth tire pressure value, when the load detected by the load detection device provides the third load value to the CPU. Adjustment of the tire pressure may occur while the tire is rotating, or non-rotating. And the process concludes at process step 458.

As will be apparent to those skilled in the art, a number of modifications could be made to the preferred embodiments which would not depart from the spirit or the scope of the present invention. While the presently preferred embodiments have been described for purposes of this disclosure, numerous changes and modifications will be apparent to those skilled in the art. Insofar as these changes and modifications are within the purview of the appended claims, they are to be considered as part of the present invention.

What is claimed is:

1. A tire pressure management system comprising:
an axle, the axle housing a pressurized fluid and supported by a tire;
a vehicle frame supported by the axle;
a suspension disposed between and secured to each the vehicle frame and the axle;
a pressure management controller having a housing supported by the vehicle frame and communicating with the tire;
a load detection device interacting with the suspension and communicating with the pressure management controller;
a hubcap supported by the axle and having an interior and an exterior; and
a rotary union axially aligned with the axle and supported by the hubcap, the rotary union including at least:
a rotary union housing, the rotary union housing provides at least a fluid distribution chamber and a central bore, the central bore providing an internal surface and a portion of said fluid distribution chamber, in which the rotary union further comprising:
a bearing sleeve in pressing contact with the central bore;
a fluid conduit, the fluid conduit having an internal surface, an external surface, a downstream end and an upstream end, the fluid conduit supported by the bearing sleeve;
a pair of bearings, each of the pair of bearings providing an inner race and an outer race, each inner race of the pair of bearings in direct contact adjacency with the external surface of the fluid conduit, each outer race of the pair of bearings in pressing communication with the internal surface the bearing sleeve, a first bearing of the pair of bearings adjacent the downstream end of said fluid conduit, and a second bearing of the pair of bearings adjacent the upstream end of said fluid conduit;
a bearing spacer separate and distinct from the bearing sleeve forming no part of the bearing sleeve, the bearing spacer disposed between and in contact adjacency with each bearing of the pair of bearings; and
a pair of fluid seals simultaneously present and disposed within the rotary union housing, a first seal of said pair of fluid seals engaging said external surface of the fluid conduit and said bore surface of said central bore, said first seal disposed between said first bearing and said downstream end of said fluid conduit, and a second seal of said pair of fluid seals engaging said external surface of the fluid conduit and said bore surface of said central bore, said second seal disposed between said second bearing and said upstream end of said fluid conduit, wherein each first seal and second seal of said pair of fluid seals forms a rotary seal between said external surface of the fluid conduit and said bore surface of said central bore.

2. The tire pressure management system of claim 1, in which the pressure management controller comprising:
the housing supported by the vehicle frame;
a control electronics assembly enclosed by the housing;
a fluid inlet port supported by the housing and in fluid communication with a fluid supply, the fluid supply supported by the vehicle frame;
a pressure transducer supported by the housing, and communicating with the control electronics assembly; and
a first pneumatic piston valve disposed between and communicating with the fluid inlet port and a fluid inflate and deflate port.

3. The tire pressure management system of claim 2, in which the pressure management controller further comprising:
a fluid outlet port supported by the housing and in fluid communication with ambient atmosphere;
a second pneumatic piston valve disposed between and communicating with the fluid inflate and deflate port and a fluid exhaust port;
a combination power and communications connector in electrical communication with the control electronics assembly; and
a system programming device in electronic communication with the control electronics assembly.

4. The tire pressure management system of claim 3, in which the control electronics assembly comprising a central processing unit (CPU), the CPU providing at least a lookup table, the lookup table associates a value for a load supported by the suspension to a predetermined pressure for the tire, the CPU directing an inflation, else a deflation of the tire based on the value for the load supported by the suspension and detected by the load detection device, the load detection device communicates a measured load value to the CPU, the CPU identifies a corresponding tire pressure value and directs an adjustment in the tire pressure based on the identified tire pressure value.

5. The tire pressure management system of claim 4, in which the system programming device comprising:
an information input/output circuit communicating with the control electronics assembly;
an information display screen interacting with the information input/output circuit; and
an information input device interacting with the information input/output circuit.

6. The tire pressure management system of claim 5, in which said information input/output device is a keyboard.

7. The tire pressure management system of claim 5, in which said information input/output device is a memory interface device, the memory interface device interacting with the CPU.

8. The tire pressure management system of claim 5, in which said load detection device is a strain gauge.

9. The tire pressure management system of claim 5, in which said load detection device is a proximity sensor, the proximity sensor selected from a group consisting of inductive, capacitive, magnetic, ultrasonic, and photoelectric sensors.

10. A method of using a tire pressure management system by steps comprising:
providing an axle, the axle housing a pressurized fluid and supported by a tire;
providing a vehicle frame supported by the axle;
providing a suspension disposed between and secured to each the vehicle frame and the axle;
providing pressure management controller having a housing supported by the vehicle frame and communicating with the tire;

providing a load detection device interacting with the suspension and communicating with the pressure management controller;
providing a hubcap supported by the axle and having an interior and an exterior;
providing a rotary union axially aligned with the axle and communicating with the hubcap, the rotary union including at least a rotary union housing, the rotary union housing providing at least a fluid distribution chamber and a central bore, the central bore providing an internal surface and a portion of said fluid distribution chamber in which the rotary union further comprising:
a bearing sleeve in pressing contact with the central bore;
a fluid conduit, the fluid conduit having an internal surface, an external surface, a downstream end and an upstream end, the fluid conduit supported by the bearing sleeve;
a pair of bearings, each of the pair of bearings providing an inner race and an outer race, each inner race of the pair of bearings in direct contact adjacency with the external surface of the fluid conduit, each outer race of the pair of bearings in pressing communication with the internal surface the bearing sleeve, a first bearing of the pair of bearings adjacent the downstream end of said fluid conduit, and a second bearing of the pair of bearings adjacent the upstream end of said fluid conduit;
a bearing spacer separate and distinct from the bearing sleeve forming no part of the bearing sleeve, the bearing spacer disposed between and in contact adjacency with each bearing of the pair of bearings; and
a pair of fluid seals simultaneously present and disposed within the rotary union housing, a first seal of said pair of fluid seals engaging said external surface of the fluid conduit and said bore surface of said central bore, said first seal disposed between said first bearing and said downstream end of said fluid conduit, and a second seal of said pair of fluid seals engaging said external surface of the fluid conduit and said bore surface of said central bore, said second seal disposed between said second bearing and said upstream end of said fluid conduit, wherein each first seal and second seal of said pair of fluid seals forms a rotary seal between said external surface of the fluid conduit and said bore surface of said central bore;
providing a central processing unit (CPU), the CPU confined by said pressure management controller, the CPU programmed with at least a lookup table, the lookup table associates a value of a load supported by the suspension to a predetermined pressure for said tire;
providing a system programming device, the system programming device interacting with the CPU;
initiating said CPU;
initiating said load detection device;
detecting a value of a load supported by said suspension, said value of the load supported by said suspension detected by said load detection device;
providing said detected value of said load detected by said load detection device to said CPU;
determining a desired tire pressure for said tire based on the value of the load supported by the suspension and detected by the load detection device; and
directing an inflation, else a deflation of the tire to the desired tire pressure based on the value of the load supported by the suspension and detected by the load detection device, in which the tire is rotating else non-rotating.

11. The method of using a tire pressure management system of claim 10, in which the pressure management controller comprising:
the housing supported by the vehicle frame;
a control electronics assembly enclosed by the housing;
a fluid inlet port supported by the housing and in fluid communication with a fluid supply, the fluid supply supported by the vehicle frame;
a pressure transducer supported by the housing, and communicating with the control electronics assembly; and
a first pneumatic piston valve disposed between and communicating with each the fluid inlet port and a fluid inflate and deflate port.

12. The method of using a tire pressure management system of claim 11, in which the pressure management controller further comprising:
a fluid outlet port supported by the housing and in fluid communication with ambient atmosphere;
a second pneumatic piston valve disposed between and communicating with the fluid inflate and deflate port and a fluid exhaust port;
a combination power and communications connector in electrical communication with the control electronics assembly; and
a system programming device in electronic communication with the control electronics assembly.

13. The method of using a tire pressure management system of claim 12, in which the system programming device comprising:
an information input/output circuit communicating with the control electronics assembly;
an information display screen interacting with the information input/output circuit; and
an information input device interacting with the information input/output circuit.

14. The method of using a tire pressure management system of claim 13, in which said information input/output device is a keyboard.

15. The method of using a tire pressure management system of claim 13, in which said information input/output device is a memory interface device, the memory interface device interacting with the CPU.

16. The method of using a tire pressure management system of claim 13, in which said load detection device is a strain gauge.

17. The method of using a tire pressure management system of claim 13, in which said load detection device is a proximity sensor.

18. The method of using a tire pressure management system of claim 17, in which said proximity sensor selected from a group consisting of inductive, capacitive, magnetic, and photoelectric sensors.

19. A method of producing and using a tire pressure table by steps comprising:
initiating a load detection device associated with a trailer;
establishing a minimum tire pressure value for a tire, the tire mounted on the trailer;
storing the established minimum tire pressure value in the tire pressure table, the tire pressure table within a pressure management controller, the pressure management controller supported by the trailer, and communicating with the load detection device;

establishing a maximum tire pressure value for the tire on the trailer;

storing the established maximum tire pressure value in the tire pressure table within the pressure management controller;

collecting a no load value for a condition of the trailer having no load, the no load value provided by the load detection device;

pairing the no load value with the established minimum tire pressure value;

storing the no load value paired with the established minimum tire pressure value in the tire pressure table within the pressure management controller; and adjusting the tire pressure to the established minimum tire pressure value when the load detection device provides the no load value;

determining a first load value for the trailer supporting a first load, the first load greater than the no load, the first load value is different from the no load value;

pairing the first load value with the stored established maximum tire pressure value;

storing the first load value paired with the stored established maximum tire pressure value in the tire pressure table within the pressure management controller;

adjusting the tire pressure to the stored established maximum tire pressure value when the load detection device provides the first load value, the first load value greater than the stored no load value;

determining a second load value for the trailer supporting a second load, the second load greater than the first load, the second load value provided by the load detecting device;

calculating a third tire pressure value, the third tire pressure value has a value between the established minimum and established maximum tire pressure values, the third tire pressure value based on a derived percentage value, the derived percentage value is a percent of the second load value made up by the first load value;

calculating a difference between the established minimum and established maximum tire pressure values;

determining a pressure adjustment value by multiplying the difference between the established minimum and established maximum tire pressure values by the derived percentage value;

adding the determined pressure adjustment value to the established minimum pressure value, the determined a pressure adjustment value added to the established minimum pressure is the third tire pressure value;

storing the third tire pressure value in the tire pressure table;

depairing the first load value from the maximum tire pressure value;

pairing the second load value with the stored established maximum tire pressure value;

storing the second load value paired with the stored established maximum tire pressure value in the tire pressure table;

pairing the first load value with the stored third tire pressure value;

storing the first load value paired with the third tire pressure value in the tire pressure table;

adjusting the tire pressure to the maximum tire pressure value when the load detection device provides the second load value;

determining a third load value provided by the load detecting device for the trailer supporting a third load, the third load less than each the first load and the second load;

calculating a fourth tire pressure value, the fourth tire pressure value has a value between the third tire pressure value and the established minimum tire pressure value, the fourth tire pressure value based on a second derived percentage value, the second derived percentage value is a percent of the second load value made up by the third load value;

determining a second pressure adjustment value by multiplying the difference between the established minimum and established maximum tire pressure values by the second derived percentage value;

adding the second determined pressure adjustment value to the established minimum pressure value, the second determined pressure adjustment value added to the established minimum pressure is the fourth tire pressure value;

storing the fourth tire pressure value in the tire pressure table;

pairing the third load value with the fourth tire pressure value;

storing the third load value paired with the fourth tire pressure value in the tire pressure table; and adjusting the tire pressure to the fourth tire pressure value when the load detection device provides the third load value.

\* \* \* \* \*